(12) United States Patent
Burke et al.

(10) Patent No.: US 10,442,260 B2
(45) Date of Patent: Oct. 15, 2019

(54) ASSEMBLY FOR A CENTRAL TIRE INFLATION SYSTEM

(71) Applicant: DANA HEAVY VEHICLE SYSTEMS GROUP, LLC, Maumee, OH (US)

(72) Inventors: Douglas C. Burke, Deerfield, MI (US); Christopher P. Lewark, Grand Rapids, OH (US); Jason M. Sidders, Perrysburg, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 147 days.

(21) Appl. No.: 15/575,093

(22) PCT Filed: May 20, 2016

(86) PCT No.: PCT/US2016/033498
§ 371 (c)(1),
(2) Date: Nov. 17, 2017

(87) PCT Pub. No.: WO2016/187524
PCT Pub. Date: Nov. 24, 2016

(65) Prior Publication Data
US 2018/0154713 A1    Jun. 7, 2018

Related U.S. Application Data

(60) Provisional application No. 62/164,209, filed on May 20, 2015.

(51) Int. Cl.
*B60C 29/02* (2006.01)
*B60C 23/00* (2006.01)

(52) U.S. Cl.
CPC ............ *B60C 29/02* (2013.01); *B60C 23/003* (2013.01)

(58) Field of Classification Search
CPC ............................. B60C 29/02; B60C 23/003
(Continued)

(56) References Cited

U.S. PATENT DOCUMENTS 4,932,451 A    6/1990   Williams et al.
4,938,272 A    7/1990   Sandy, Jr. et al.
(Continued)

FOREIGN PATENT DOCUMENTS

WO    2014/028142 A1    2/2014

OTHER PUBLICATIONS

European Patent Office, International Search Report and Written Opinion issued in PCT/US2016/033498, dated Jul. 22, 2016, 14 pages, European Patent Office, Rijswijk, Netherlands.

*Primary Examiner* — S. Joseph Morano
*Assistant Examiner* — Jean W Charleston
(74) *Attorney, Agent, or Firm* — Marshall & Melhorn, LLC

(57) ABSTRACT

A tire inflation system including a wheel rim having an aperture through the radially exterior and interior surfaces thereof. A wheel valve assembly including a mounting portion coupled with the wheel rim interior surface. The mounting portion having an opening in fluid communication with the wheel rim aperture. A cap portion coupled with the mounting portion, defining a fluid inlet and a perforation in fluid communication. A valve at least partially disposed within the cap portion, and disposed parallel with the longitudinal axis of the wheel rim. A base portion coupled with the cap portion, and at least partially surrounding the valve. A fluid outlet defined by the base portion, and in selective fluid communication with the fluid inlet via the valve. A biasing member disposed at least partially around the valve, whereby the biasing member is compressed in the wheel valve assembly closed position.

14 Claims, 21 Drawing Sheets

(58) Field of Classification Search
USPC .......................................................... 152/427
See application file for complete search history.

(56) References Cited

U.S. PATENT DOCUMENTS

| | | | | |
|---|---|---|---|---|
| 6,474,383 | B1* | 11/2002 | Howald | B60C 23/003 |
| | | | | 152/416 |
| 6,880,598 | B2 | 4/2005 | Haunhorst et al. | |
| 7,686,051 | B2 | 3/2010 | Medley et al. | |
| 8,307,868 | B2 | 11/2012 | Medley et al. | |
| 8,307,869 | B2 | 11/2012 | Medley et al. | |
| 8,844,596 | B2 | 9/2014 | Medley et al. | |
| 8,931,534 | B2* | 1/2015 | Eaton | B60C 23/003 |
| | | | | 152/415 |
| 9,296,264 | B2* | 3/2016 | Mozingo | B60C 23/003 |
| 9,573,428 | B2* | 2/2017 | Sidders | F16K 15/025 |
| 2005/0194080 | A1* | 9/2005 | White | B60C 23/003 |
| | | | | 152/417 |
| 2010/0147387 | A1* | 6/2010 | Medley | B60C 23/003 |
| | | | | 137/1 |
| 2013/0276902 | A1 | 10/2013 | Medley et al. | |

* cited by examiner

US 10,442,260 B2

ASSEMBLY FOR A CENTRAL TIRE INFLATION SYSTEM

BACKGROUND

The present subject matter relates to an assembly and, more particularly, to an assembly for a central tire inflation system.

Vehicles that have central tire inflation systems employ wheel valves to retain fluid in their wheels and adjust or maintain the pressure thereof. Conventional wheel valves may suffer from performance issues due to the range of temperatures they operate in, the forces they are exposed to, and/or the specialized functions they are designed to perform.

It would be advantageous to develop an assembly that includes a valve that is inexpensive, may be used with a wheel, is operable in an increased temperature range, is operable at higher pressures, is able to be quickly closed with a minimal drop in pressure by a tire inflation system during an inflation cycle or a deflation cycle, and remains closed when desired.

SUMMARY

The present disclosure provides for a tire inflation system. In one embodiment, the tire inflation system includes a wheel rim having a radially interior surface and a radially exterior surface. An aperture extends through the wheel rim exterior surface and interior surfaces. The tire inflation system also includes a wheel valve assembly operable between an open position and a closed position. The wheel valve assembly including a mounting portion coupled with the wheel rim interior surface, wherein the mounting portion includes an opening therethrough in fluid communication with the wheel rim aperture. A cap portion is coupled with the mounting portion radially inward of the wheel rim interior surface. The cap portion defines a fluid inlet and a perforation in fluid communication. A fluid conduit is in fluid communication with a fluid supply and the cap portion fluid inlet. A is valve at least partially disposed within the cap portion, wherein the valve comprises a longitudinal axis parallel with a longitudinal axis of the wheel rim. A base portion is coupled with the cap portion, and is also disposed radially inward of the wheel rim interior surface. The base portion at least partially surrounds the valve. A fluid outlet is defined by the base portion. The fluid outlet is in selective fluid communication with the fluid inlet via the valve. Further, a biasing member is disposed at least partially around the valve, wherein an end of the biasing member abuts a portion of the valve, and the biasing member is compressed in the wheel valve assembly closed position.

BRIEF DESCRIPTION OF THE SEVERAL VIEWS OF THE DRAWINGS

The accompanying drawings, incorporated herein as part of the specification, illustrate the presently disclosed subject matter, and with the description, serve to explain the principles of the disclosed subject matter and to enable a person skilled in the pertinent art to make and use the disclosed subject matter.

DETAILED DESCRIPTION OF EMBODIMENTS

Figure 1:
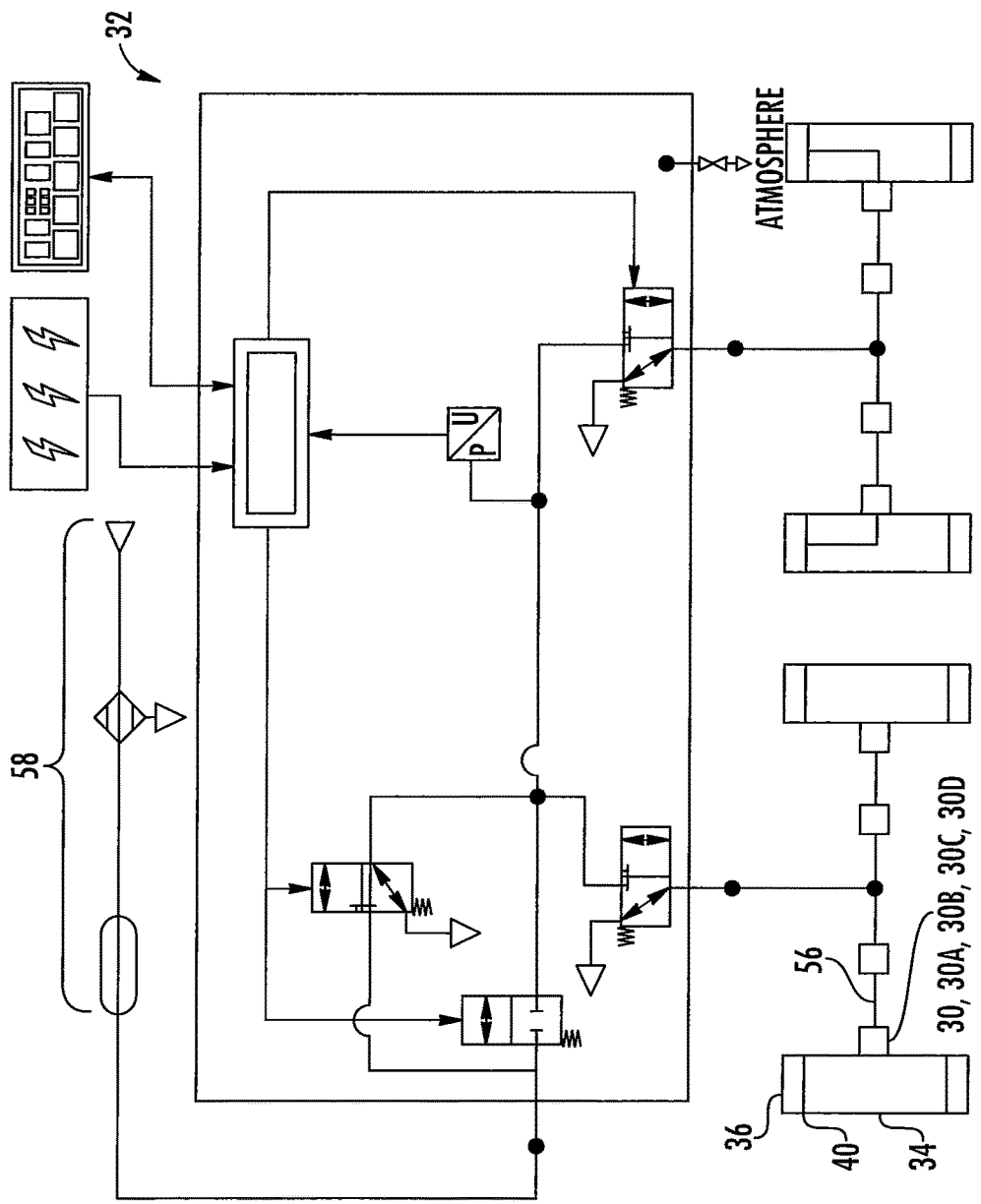
FIG. 1 is a schematic view of an embodiment of a central tire inflation system in accordance with the invention.

It is to be understood that the presently disclosed subject matter may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Various embodiments of a wheel valve assembly 30, 30A, 30B, 30C, 30D are described herein. The embodiments of the assembly 30, 30A, 30B, 30C, 30D may have applications to commercial and off-highway vehicles. It would also be understood by one of ordinary skill in the art that the subject matter disclosed herein could have industrial, locomotive, military and aerospace applications.

Figure 2:
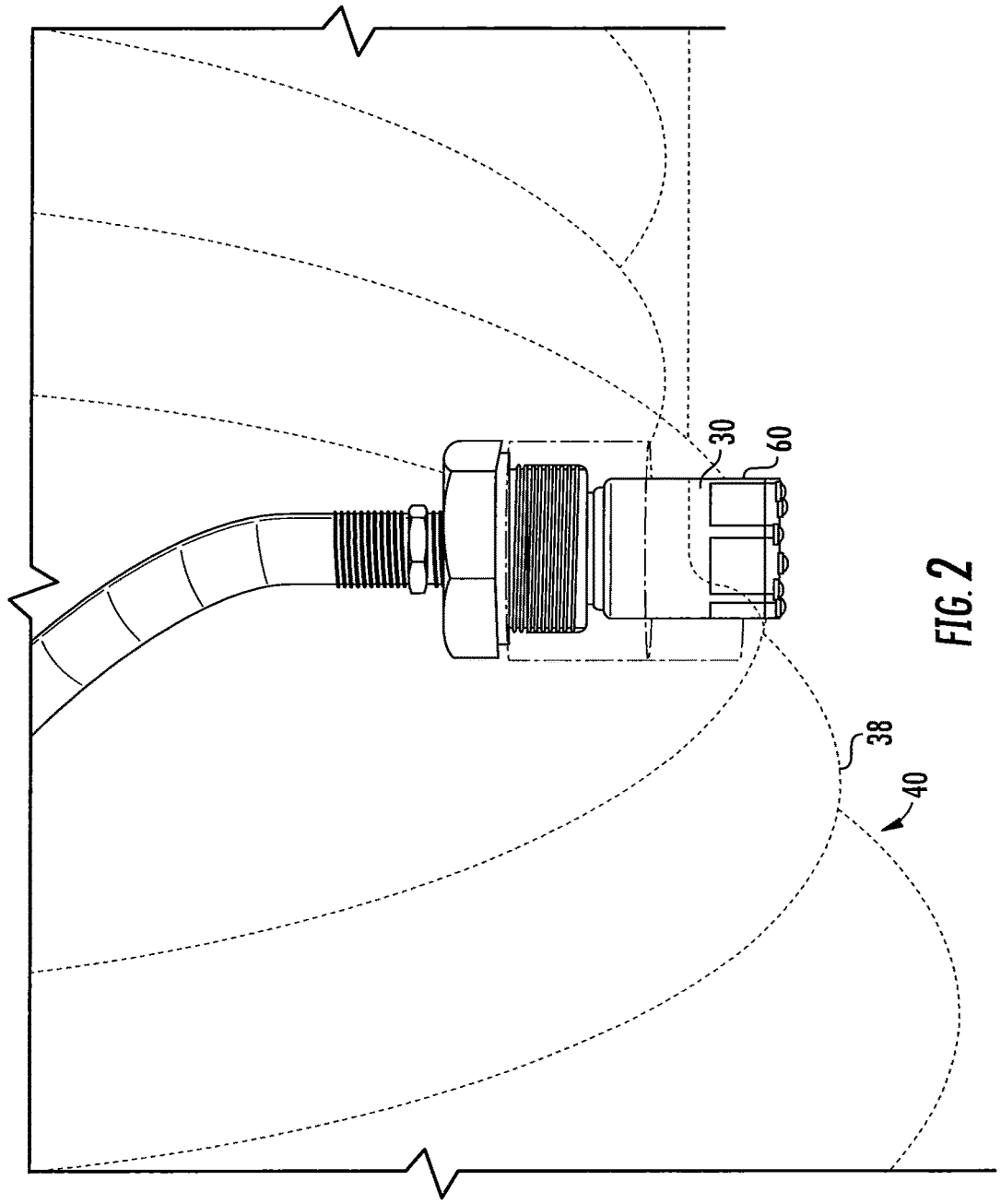
FIG. 2 depicts a perspective view of an embodiment of an assembly in accordance with the invention.

Referring now to FIGS. 1 and 2, the wheel valve assembly 30, 30A, 30B, 30C, 30D may be utilized in or as a portion of a central tire inflation system 32 (also referred to as a "CTIS") to check or adjust (i.e., increase and/or decrease) the pressure of a fluid housed within a wheel assembly 34. The wheel assembly 34 is formed by sealingly attaching a tire 36 to an outer surface 38 of a wheel rim 40. Tires and wheel rims which are conventional in the art are suitable for use with the assembly 30, 30A, 30B, 30C, 30D. The wheel assembly 34 houses a pressurized fluid that is in a gaseous state. The pressurized fluid housed in the wheel assembly 34 may be air at a pressure from about 5 to 125 psi. The pressure of the fluid housed within the wheel assembly 34 may also be referred to herein as "tire pressure" or "air pressure."

Figure 3:
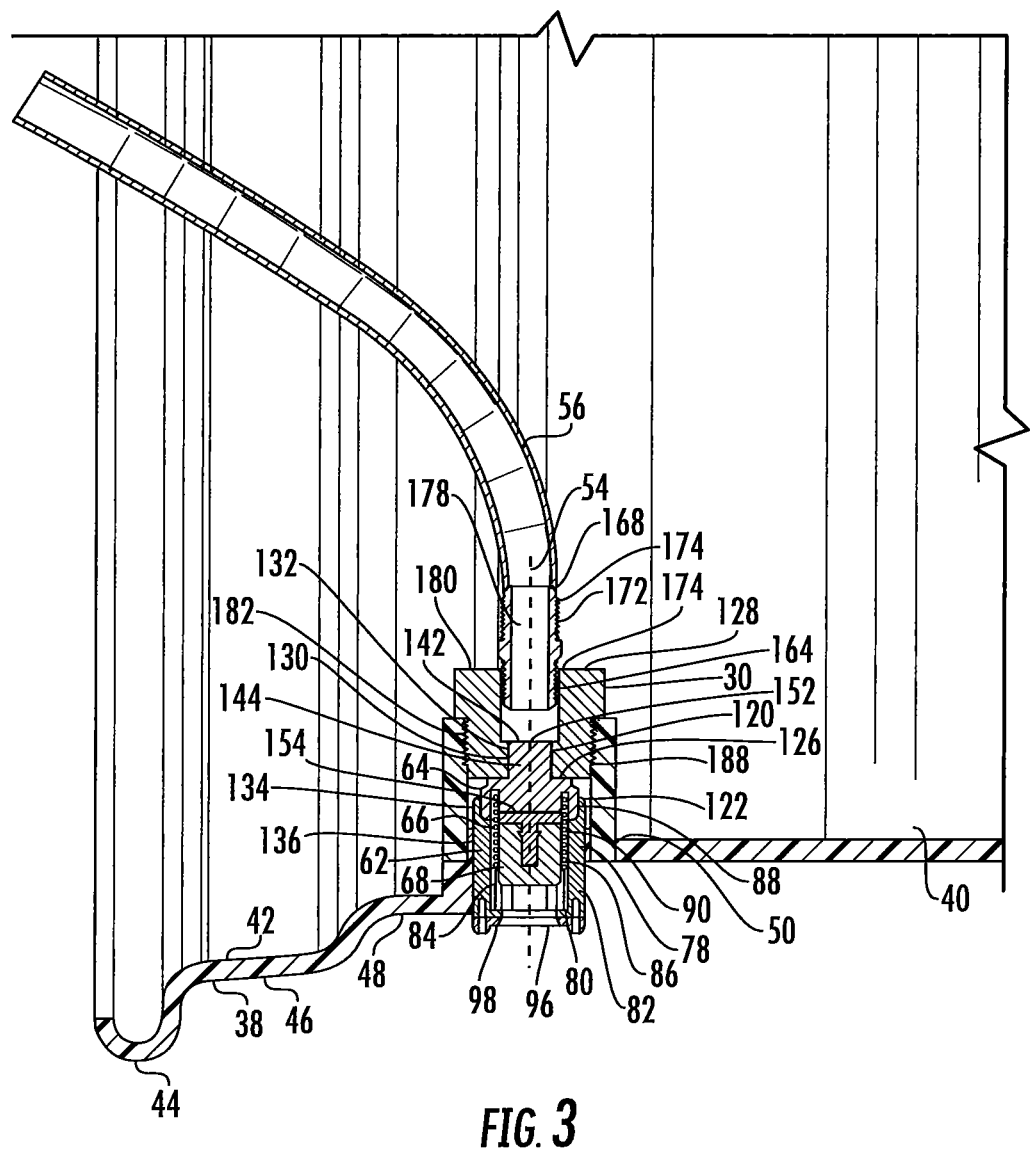
FIG. 3 depicts a sectional view of the assembly of FIG. 2.

In an embodiment, as illustrated in FIG. 3, the wheel rim 40 comprises an inner surface 42 and the outer surface 38. In certain embodiments, the wheel rim 40 also comprises a first flange portion 44. A first portion 46 is attached to and extends axially from, or is formed unitarily with, the first flange portion 44 on an end. An outer diameter of the first flange portion 44 is greater than an outer diameter of the first portion 46. On an opposite end, the first portion 46 is attached to a second portion 48. The outer diameter of the first portion 46 is greater than an outer diameter of the second portion 48.

Figure 16:
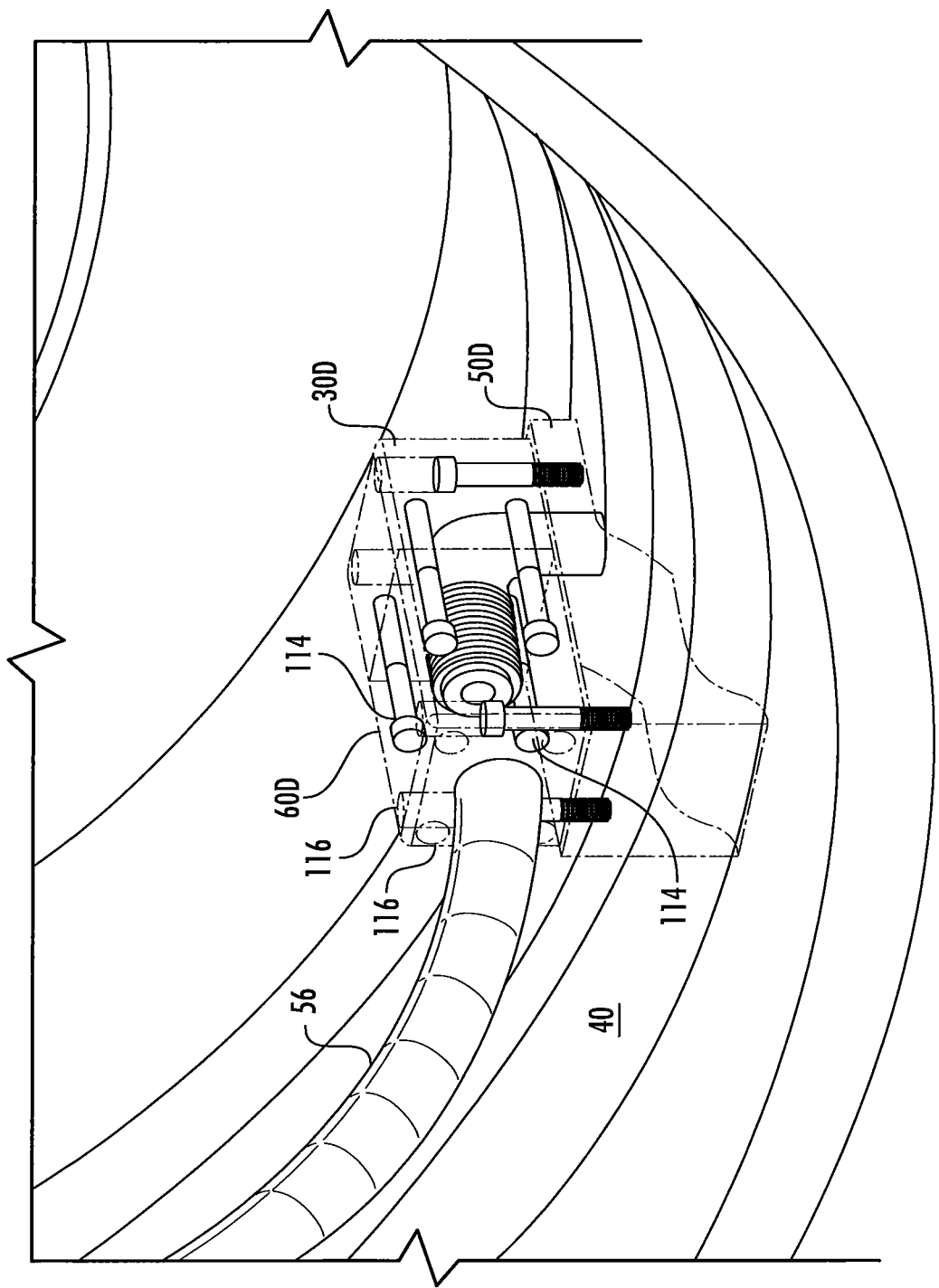
FIG. 16 depicts a perspective view of another embodiment of the assembly in accordance with the invention.
Figure 17:
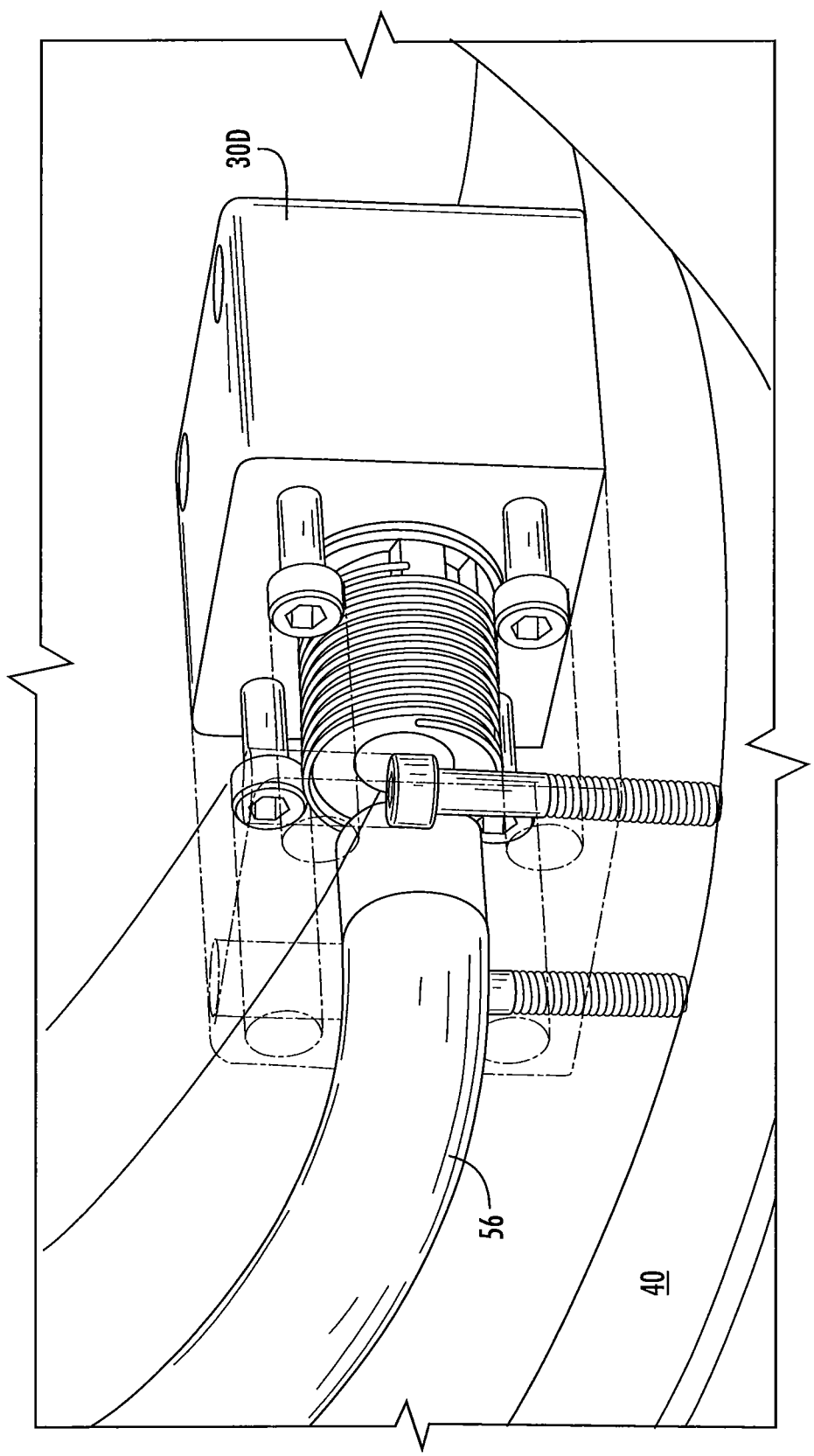
FIG. 17 depicts an enlarged perspective view of the assembly of FIG. 16.
Figure 18:
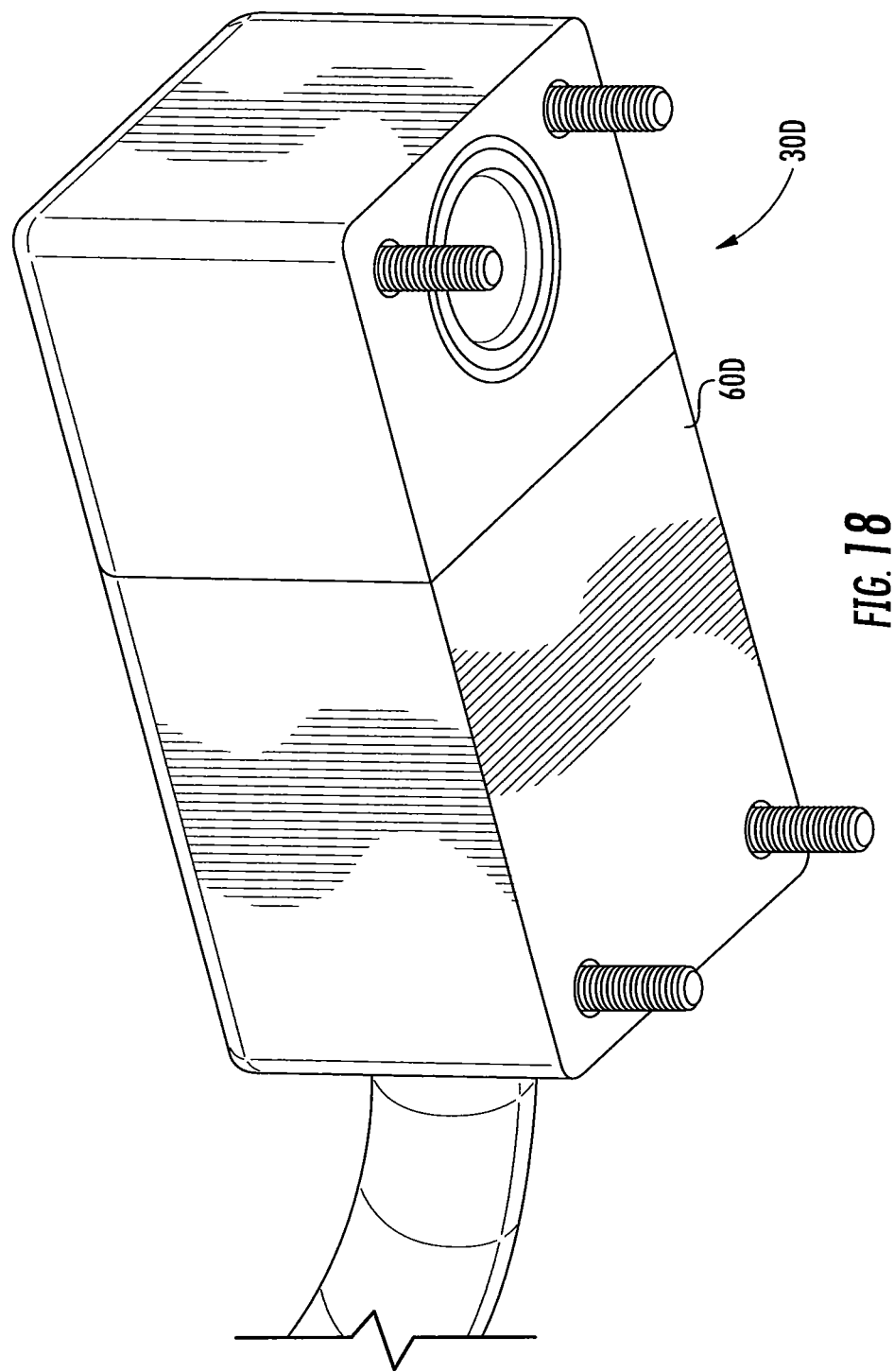
FIG. 18 depicts a perspective view of a portion of the assembly of FIG. 16.

The assembly 30, 30A, 30B, 30C, 30D may be attached to the inner surface, the outer surface, an inboard surface or an outboard surface of the wheel rim. In an embodiment like the one illustrated in FIG. 2, the assembly 30 extends through wheel rim 40 and beyond the outer surface 38 thereof. However, it should be appreciated that the assembly 30 need not extend through the wheel rim 40 as is shown for the embodiments illustrated in, for example, FIGS. 10, 12, and 16.

The wheel rim 40 may include a mounting portion 50, 50B, 50C for attaching the assembly 30, 30A, 30B, 30C, 30D to the wheel rim 40. In certain embodiments, the assembly 30B, 30C, 30D may be attached to the mounting portion 50B, 50C and a fluid channel 52 may be provided through the wheel rim 40 (see, for example, FIG. 12) which allows the assembly 30B, 30C, 30D to communicate with the pressurized fluid housed in the wheel assembly 34.

Figure 19:
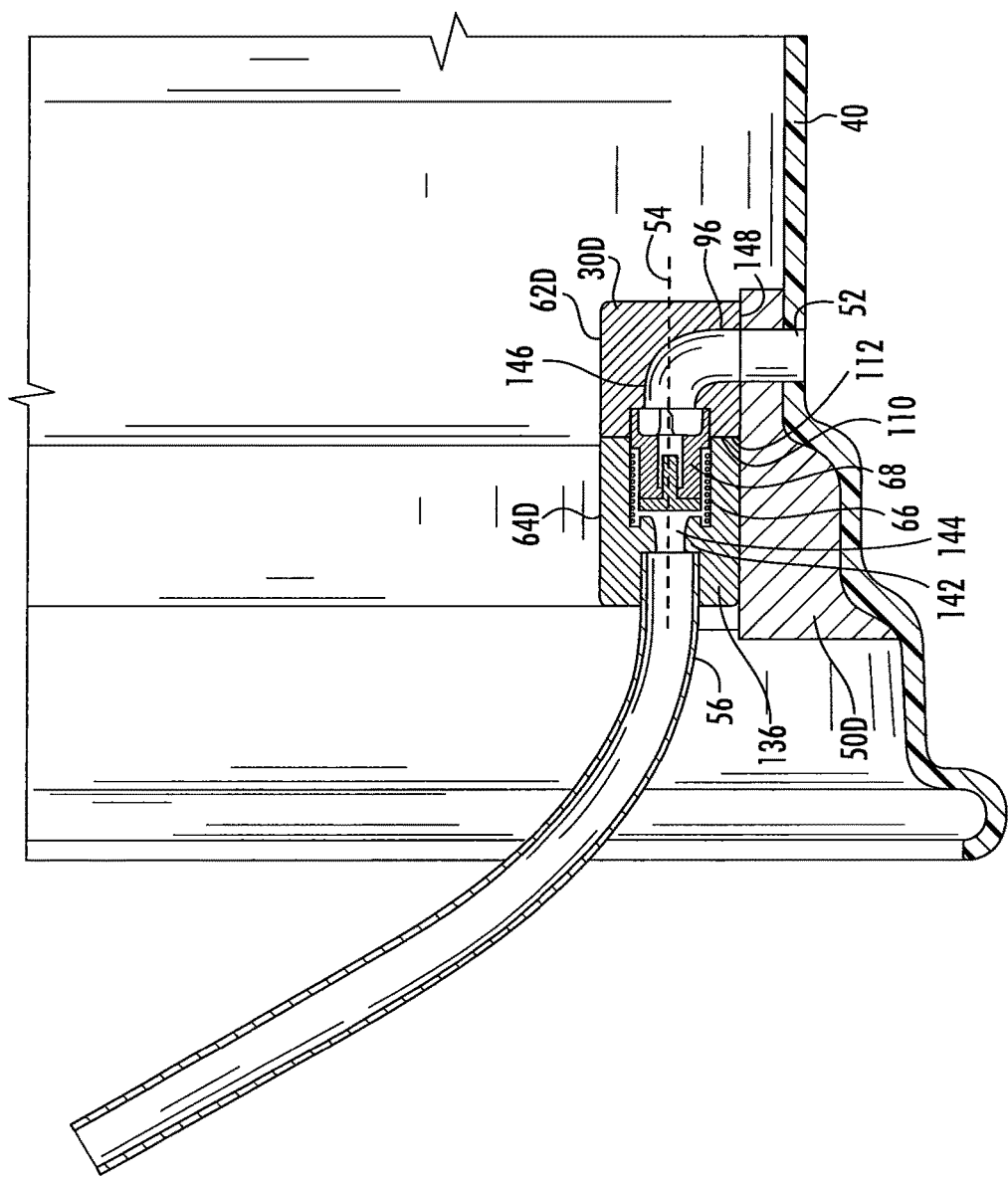
FIG. 19 depicts a sectional view of the assembly of FIG. 16.

The assembly 30, 30A, 30B, 30C, 30D may include a centerline 54. Portions of the assembly 30, 30A, 30B, 30C, 30D are aligned with the centerline 54. In the embodiments illustrated in FIGS. 3, 8 and 12, the centerline 54 extends towards and is in a perpendicular relationship with a centerline of an axle (not depicted). The axle extends through an axle housing (not depicted) and the axle housing is attached to the wheel rim 40. However, in other embodiments, like those illustrated in FIGS. 15 and 19, the centerline 54 of the assembly 30C, 30D is in a parallel relationship with the centerline of the axle.

As illustrated in FIGS. 1 and 3, the central tire inflation system 32 may comprise an inflation system conduit 56 in selective fluid communication with a fluid supply 58 and/or the wheel assembly 34 via the assembly 30, 30A, 30B, 30C, 30D. The inflation system conduit 56 is utilized to communicate fluid from the fluid supply 58 or the wheel assembly 34. The fluid supply 58 provides pressurized fluid when it is desired to check, increase, and/or decrease the tire pressure. The pressurized fluid provided by the fluid supply 58 is at a pressure that is greater than the tire pressure. The pressurized fluid provided by the fluid supply 58 may be at a pressure of 125 psi or more.

In an embodiment like the one illustrated in FIGS. 2-5, the wheel valve assembly 30, 30A, 30B, 30C, 30D may comprise the inflation system conduit 56, a male-ended connector 172, a nut 128, a housing 60, 60A, 60B, 60C, 60D including a cap portion 64 and a base portion 62, a biasing member 66, a valve 68, a filter 104, a retaining member 106, a plurality of fasteners 108, and the mounting portion 50. The base portion 62 may comprise a generally cylindrical member into which the cap portion 64, biasing member 66 and valve 68 are disposed. The base portion 62 comprises an outer wall portion 78, a lower wall portion 80, and a stem portion 82. The base portion 62, 62A, 62B, 62C, 62D may be unitarily formed by casting a metal. However, it should be understood that the base portion 62, 62A, 62B, 62C, 62D may be formed using other materials and processes. It should also be understood that the base portion may be formed by joining a plurality of components.

Figure 4:
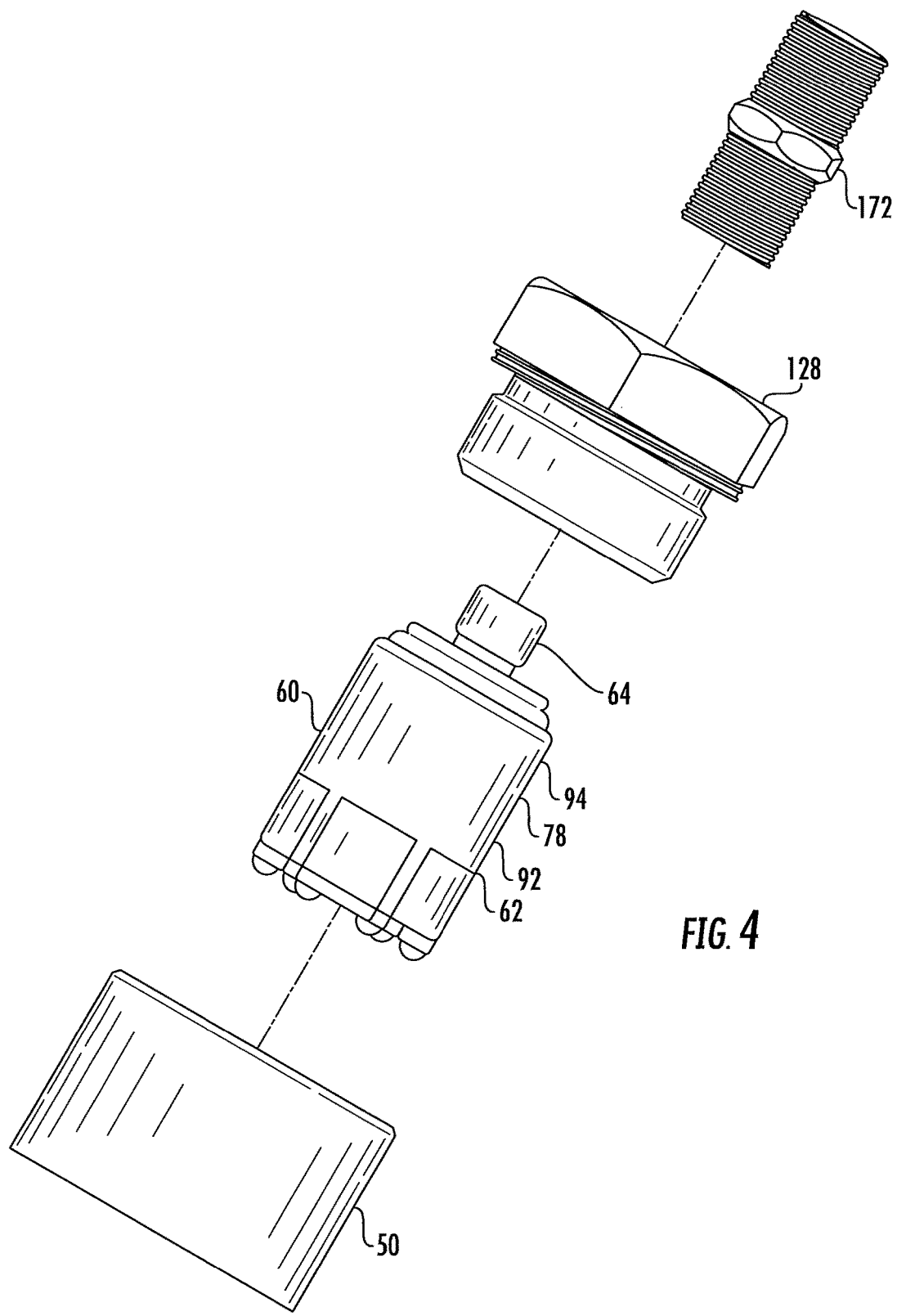
FIG. 4 depicts a partially exploded view of a portion of the assembly of FIG. 2.
Figure 5:
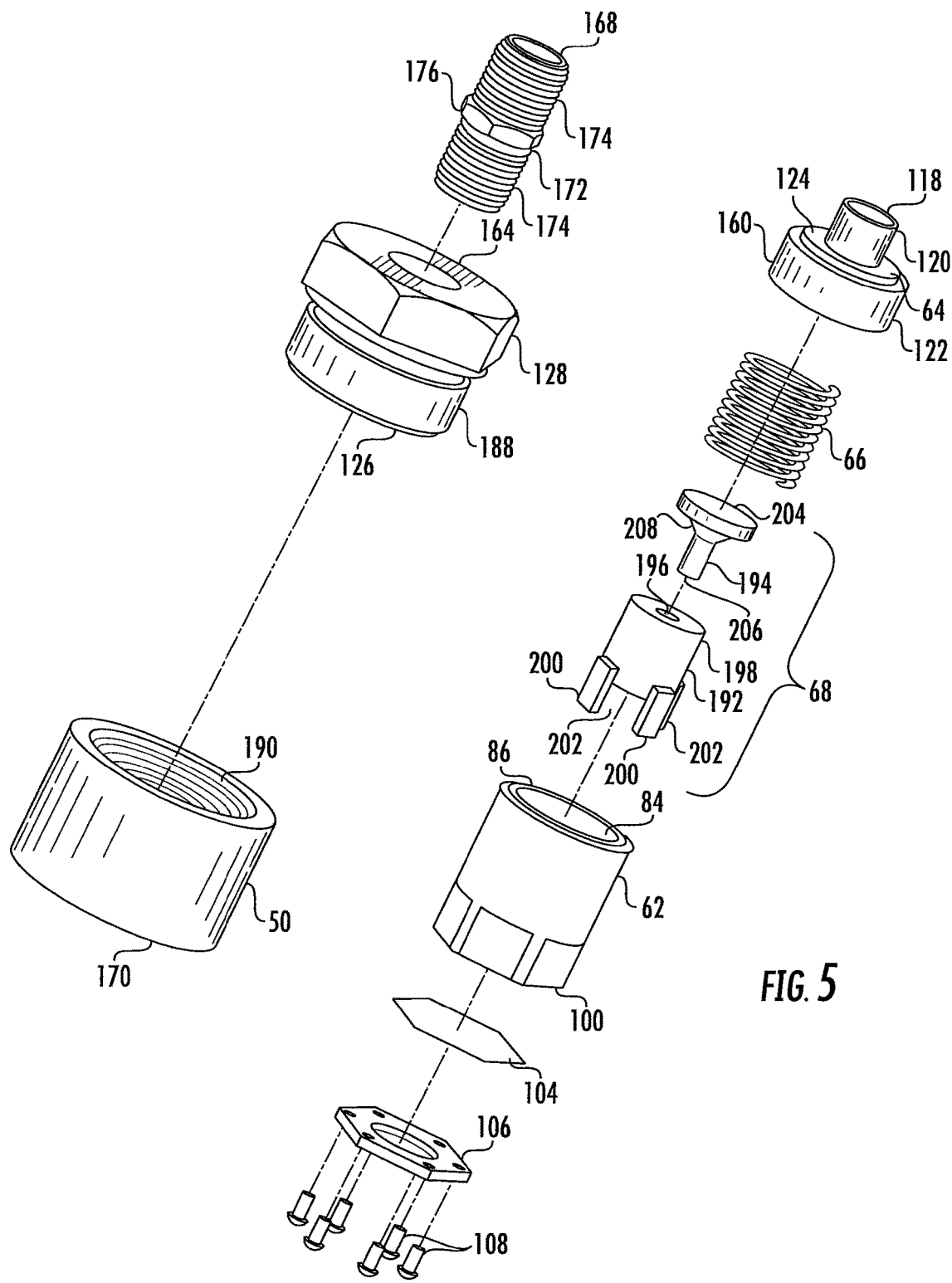
FIG. 5 depicts a fully exploded view of the portion of the assembly of FIG. 4.
Figure 5A:
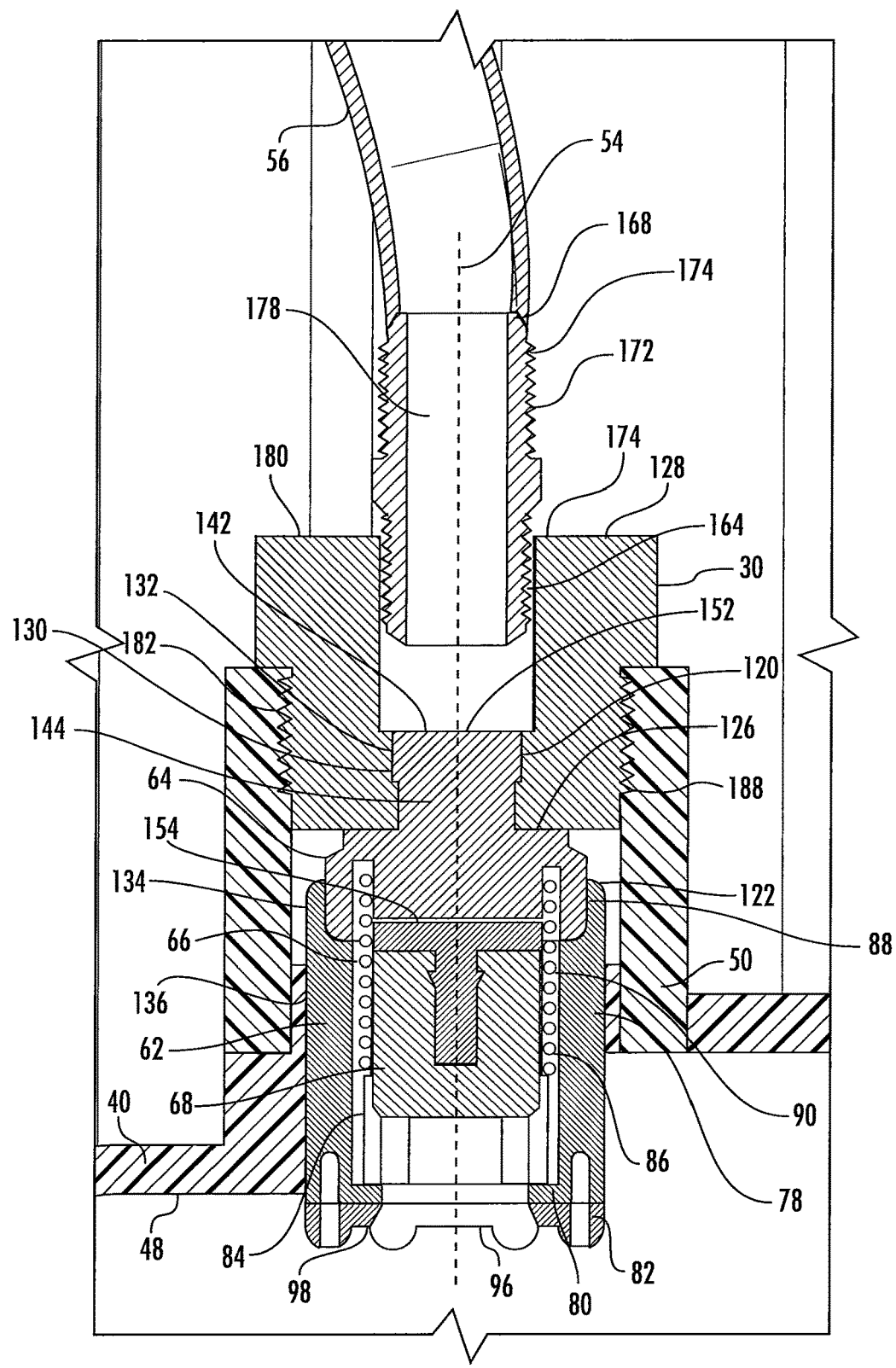
FIG. 5A depicts a sectional view of the assembly of FIG. 2.
Figure 6:
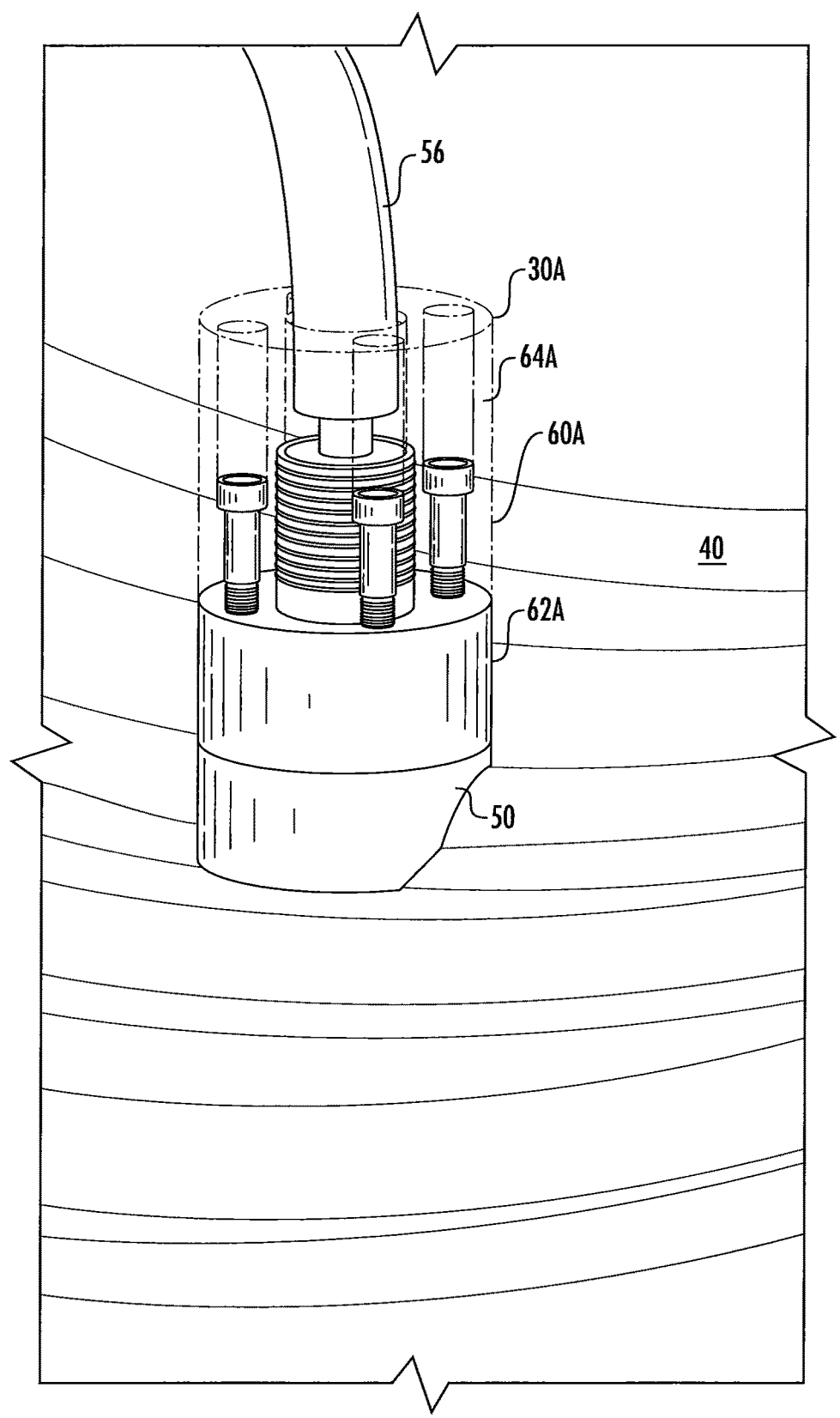
FIG. 6 depicts a perspective view of another embodiment of the assembly in accordance with the invention.
Figure 7:
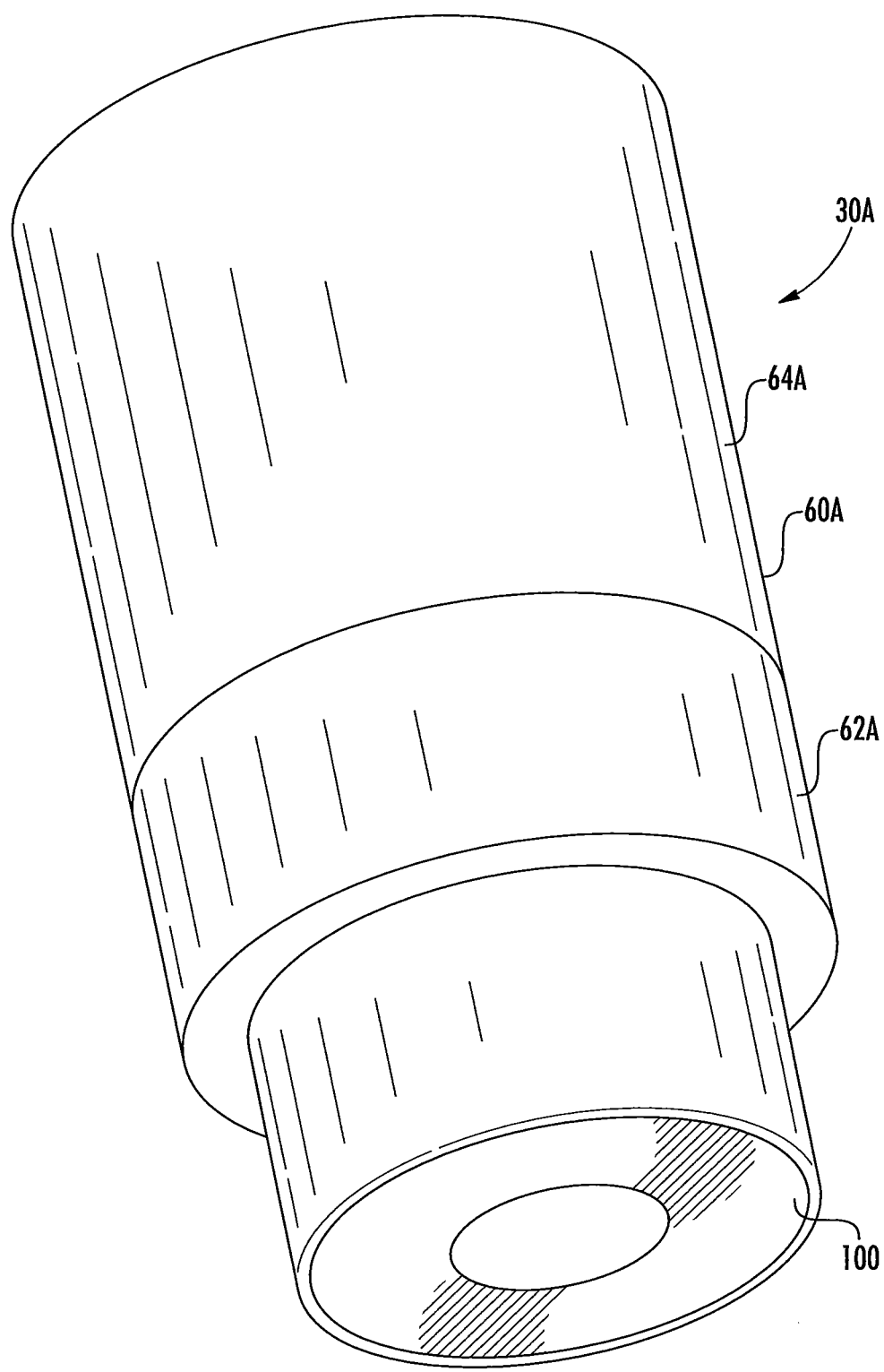
FIG. 7 depicts a perspective view of a portion of the assembly of FIG. 6.

Referring now to FIGS. 3 and 5, the outer wall portion 78 may be of a generally cylindrical geometry. The outer wall portion 78 is attached to the lower wall portion 80 at a first end thereof and extends away therefrom. The outer wall portion 78 and the lower wall portion 80 define a base cavity 84. The outer wall portion 78 comprises an inner surface 86. In an embodiment, the inner surface 86 includes a groove formed therein. The groove may be formed in a first diameter portion 88 of the inner surface. In an embodiment, as illustrated in FIGS. 2-5, the inner surface 86 also comprises a second diameter portion 90. The groove may be formed in the second diameter portion. The first diameter portion 88 has a diameter which is greater than a diameter of the second diameter portion 90. In certain embodiments, a ramped transition connects the first diameter portion and the second diameter portion. However, in other embodiments, the transition between the first diameter portion and the second diameter portion is sharply defined. As illustrated, the first diameter portion 88 is attached to an end of the base portion 62.

Referring now to FIG. 4, an outer surface 92 of the outer wall portion 78 may be knurled. In other embodiments (not depicted), the outer surface may include a thread portion formed thereon for engaging a thread formed in a component the assembly is coupled to. In an embodiment, a portion 94 of the outer surface 92 of the outer wall portion 78 is of a substantially constant diameter.

As illustrated in FIG. 3, the lower wall portion 80 is attached to the outer wall portion 78 on a side and the stem portion 82 on an opposite side thereof. The lower wall portion 80 is in a perpendicular relationship with both the outer wall portion 78 and the stem portion 82. The lower wall portion 80 defines a perforation 96 formed in the base portion 62, 62A, 62B, 62C, which hereinafter may also be referred to herein as the "base perforation." The base perforation 96 extends through the lower wall portion 80 and allows the base cavity 84 to communicate with a stem cavity 98.

The base perforation 96 is shaped to militate against pressure losses that occur as fluid flows through an orifice constriction and to set a relative flow rate of the fluid that enters the base cavity 84 or the stem cavity 98. The base perforation 96 has a diameter which is of a length that varies radially and may be of a generally hourglass shape. Alternatively, the base perforation 96 may be of another shape that militates against pressure losses that occur as a fluid flows through an orifice constriction. In an embodiment, the diameter of the base perforation 96 varies from a first end adjacent the base cavity 84 to a second end adjacent the stem cavity 98. In this embodiment, the diameter of the base perforation 96 may gradually decrease in length from the first end to a reduced diameter in a center portion of the lower wall portion 80 and then gradually increases in length along a remaining portion of the lower wall portion 80 to the second end. In other embodiments (not depicted), the varying diameter of the base perforation may be defined by a pair of circular fillets formed in the lower wall portion or by other conic sections.

The stem portion 82 is in fluid communication with the wheel assembly 34. In certain embodiments, as illustrated in FIGS. 2-9, the stem portion 82 may be of a generally cylindrical shape. A portion of the stem portion 82 may form a first end 100 of the housing 60, 60A, 60B, 60C, 60D. The stem portion 82 is attached to the lower wall portion 80 at a first end thereof and extends away therefrom. The lower wall portion 80 and the stem portion 82 define the stem cavity. In an embodiment (not depicted), an inner surface of the stem portion 82 includes a groove formed therein for engaging a filter 104. In an embodiment, as illustrated in FIG. 5, the filter 104 is attached to the stem portion by a retaining member 106. The retaining member 106 may be attached to the first end 100 of the housing 60 by one or more fasteners 108.

As illustrated in FIGS. 2-5, the cap portion 64 may be disposed within and secured to the base portion 62. An end of the cap portion 64A, 64B, 64C, 64D forms a second end 118 of the housing 60, 60A, 60B, 60C, 60D. The second end 118 of the housing 60, 60A, 60B, 60C, 60D is provided opposite the first end 100 of the housing 60, 60A, 60B, 60C, 60D.

The cap portion 64A, 64B, 64C, 64D may be unitarily formed by casting a metal. However, it should be understood that the cap portion may be formed using other materials and processes. It should also be understood that the cap portion may be formed by joining a plurality of components. In an embodiment, as illustrated in FIG. 5, the cap portion 64 comprises a first cylindrically-shaped portion 120 and a second cylindrically-shaped portion 122. In an embodiment, the second cylindrically-shaped portion 122 is of an outer diameter which is greater than an outer diameter of the first cylindrically-shaped portion 120. The outer diameter of the first cylindrically-shaped portion 120 and the outer diameter of the second cylindrically-shaped portion 122 are each substantially constant.

Additionally, a middle portion 124 connects the first cylindrically-shaped portion 120 and the second cylindrically-shaped portion 124. The middle portion 124 may be of an annular shape. The outer diameter of the second cylindrically-shaped portion 122 is greater than an outer diameter of the middle portion 124. Further, the outer diameter of the middle portion 124 may be greater than the outer diameter of the first cylindrically-shaped portion 120. Thus, in an embodiment, as illustrated in FIGS. 2-5, the cap portion 64 decreases in diameter from the second cylindrically-shaped portion 122 to the middle portion 124 and from the middle portion 124 to the first cylindrically-shaped portion 120.

The first cylindrically-shaped portion 120 of the cap portion 64 is attached on an end to the second cylindrically-shaped portion 122. The first cylindrically-shaped portion 120 and the second cylindrically-shaped portion 122 are aligned. The second cylindrically-shaped portion 122 is disposed at an end of the cap portion 64. The second cylindrically-shaped portion 122 comprises an outer wall portion 160. The outer wall portion 160 comprises an outer surface which has a substantially cylindrical shape. An end of the first cylindrically-shaped portion 120 defines the second end 118 of the housing 60. The first cylindrically-shaped portion 120 is received by a fluid conduit 164 of the nut 128. The first cylindrically-shaped portion 120 may be attached to the nut 128 via a threaded connection. A cap perforation 144 extends into the first cylindrically-shaped portion 120 to communicate with the nut fluid conduit 164. The cap portion may further comprise a ridge, or shoulder, at an end of the cap perforation 144 in communication with the nut fluid conduit 164.

In the assembly 30, the middle portion 124 abuts a nut mating surface 126. In an embodiment, the first cylindrically-shaped portion 120 is surrounded by and extends into a portion of the nut 128. A seal member (not depicted) may be provided between the nut 128 mating surface 126 and the cap portion 64 middle portion 124. The seal member may be, for example, an O-ring. In another embodiment like the one shown in FIGS. 6-9, the cap portion 64A is a generally cylindrical member. In other embodiments like those illustrated in FIGS. 10-19, the cap portion 64B, 64C, 64D is a generally rectangular-shaped member.

As illustrated in FIGS. 2-5, the first cylindrically-shaped portion 120 of the cap portion 64 is disposed within the nut 128 and comprises an outer surface 130 which abuts an inner surface 132 of the nut 128. The second cylindrically-shaped portion 122 of the cap portion 64 abuts the first diameter portion 88 of the outer wall portion 78, and the outer wall portion 78 abuts an inner surface 134 of an opening 136 that extends through the mounting portion 50.

Referring now to FIG. 3, the cap portion 64, 64A, 64B, 64C, 64D comprises a center wall portion 142 and the perforation 144, which hereinafter may also be referred to herein as the "cap perforation." The cap perforation 144 is formed through the center wall portion 142. The center wall portion 142 defines a major portion of the cap perforation 144. The center wall portion 142 may be substantially ring-shaped. A groove may be provided in the center wall portion 142. The groove is an annular recess which receives a second member end of the biasing member 66. The cap perforation 144 may be aligned with the base portion 62 perforation 96.

The cap perforation 144 is shaped to militate against pressure losses that occur as a fluid flows through an orifice constriction and to set a relative flow rate for the fluid as it is directed through the assembly 30, 30A, 30B, 30C, 30D. The cap perforation 144 is formed through the cap portion 64, 64A, 64B, 64C, 64D. As illustrated in FIG. 3, a first end 152 of the cap perforation 144 is in fluid communication with the nut 128 and a second end 154 is in fluid communication with the valve 68 when the assembly 30 is in a closed position.

The male-ended connector 172 couples the inflation system conduit 56 with the nut 128. The male-ended connector 172 includes a pair of threaded portions 174 formed on opposite ends of its outer surface. The threaded portions 174 are utilized to couple the male-ended connector 172 with the inflation system conduit 56 and with the nut 128. A hex portion 176 of the male-ended connector 172 is disposed between the threaded portions 174 and is provided on the outer surface of the male-ended connector 172 for use in coupling the male-ended connector 172 with the inflation system conduit 56 and with the nut 128. A male-ended connector fluid conduit 178 extends through the male-ended connector 172 and is in fluid communication with the inflation system conduit 56 and the nut fluid conduit 164 that extends through the nut 128.

The nut fluid conduit 164 comprises a large diameter portion 180 and a small diameter portion 182. The nut 128 is coupled with the male-ended connector 172 via the large diameter portion 180. The nut 128 is coupled with the cap portion 64 via the small diameter portion 182. The nut 128 also comprises a nut threaded portion 188. The nut threaded portion 188 is engaged with an inner threaded portion 190 of the mounting portion 50.

In the embodiment illustrated in FIGS. 2-5, the mounting portion 50 is of a generally cylindrical shape. The mounting portion 50 has an opening extending therethrough that communicates with the pressurized fluid housed in the wheel assembly 34. The housing 60 is provided in the mounting portion 50 opening for communication with the pressurized fluid housed in the wheel assembly 34. In an embodiment, the nut fluid conduit 164 is in fluid communication with the valve 68 via the cap perforation 144.

Referring now to FIG. 5, the valve 68 comprises a shuttle 192 and a plug member 194 attached to the shuttle 192. The plug member 194 is engaged with the shuttle 192 via an aperture 196 formed in the shuttle 192. The valve 68 is disposed in the base cavity 84 and is biased towards the lower wall portion 80 by the biasing member 66. The valve 68 operates as described in WO 2014/028142 and PCT/US2014/072037. Also, it is preferable that the shuttle 192 and plug member 194 are as described in WO 2014/028142 and PCT/US2014/072037.

The shuttle 192 comprises a main portion 198 and a plurality of shuttle supports 200. The shuttle 192 may be unitarily formed by injection molding a thermoplastic, for example, polyoxymethylene, such as that sold by E.I. DuPont de Nemours and Company under the trademark Delrin®. However, it should be appreciated that the shuttle 192 may be formed using other materials and processes. For example, the shuttle may be formed by machining a metal. It should also be appreciated that the shuttle may be formed by joining a plurality of components.

The main portion 198 is a substantially cylindrically-shaped body. However, it should be appreciated that the main portion may be formed of other shapes. The main portion 198 comprises an outer edge that is sharply defined. A definition of the outer edge may be defined by the process used to form the shuttle 192. The outer edge is shaped to increase a drag force applied to the valve 68 by a fluid flowing adjacent thereto. The main portion 198 defines the aperture 196. An outer surface of the main portion 198 has a diameter smaller than that of the inner surface 86 of the base portion 62 adjacent thereto. A space between the outer surface of the main portion 198 and the outer wall portion 78 forms a portion of a fluid passage which exists when the valve 68 is in the open position. A first side of the main portion 198 faces the lower wall portion 80.

The shuttle supports 200 are equally spaced apart and attached to the outer surface and the first side of the main portion 198. When the valve 68 is in an open position, the spaces 202 between successive shuttle supports 200 form a portion of the fluid passage. Each shuttle support 200 may be generally wedge-shaped or comprise a rectangular-shaped body. However, it should be appreciated that the shuttle supports may be shaped differently or be of another shape. Each of the shuttle supports 200 comprises an upper edge that is sharply defined. A definition of the upper edges may be defined by the process used to form the shuttle supports. The upper edges are shaped to increase a drag force to the valve 68 by a fluid flowing adjacent thereto. The shuttle supports 200 define an outer diameter of the shuttle 192. An end of each of the shuttle supports 200 abuts the lower wall portion 80 when the valve 68 is in a fully open position.

The plug member 194 is formed from a resilient material. The plug member 194 comprises a sealing surface 204 and a base 206. A retaining groove 208 is provided between the sealing surface 204 and the base 206. The plug member 194 may be unitarily formed. However, it should be appreciated that the plug member 194 may be formed from a plurality of components.

The sealing surface 204 is formed in a distal end of the plug member 194, which is opposite a distal end of the plug member 194 formed by the base 206. The sealing surface 204 is of a circular shape and may be flat. However, it should be understood that the sealing surface 204 may be of another shape. The sealing surface 204 is sharply defined by an outer edge. The outer edge is shaped to decrease a flow rate of the fluid flowing adjacent thereto when the valve 68 is in an open position. The outer edge may be defined by the process used to form the sealing surface 204.

The valve 68 is moveable from the closed position to the fully open position and between the closed position and the fully open position and vice versa to allow fluid communication between the central tire inflation system 32 and the wheel assembly 34. The sealing surface 204 is disposed adjacent the second end 154 of the cap perforation 144 and abuts and sealingly contacts the ridge so as to be in sealing contact therewith when the valve 68 is in the closed position.

When the valve 68 is in an open position, a space separates the ridge and the sealing surface 204. When the valve 68 is in the fully open position, each of the shuttle supports 200 abuts the lower wall portion 80. Under certain conditions, the valve 68 may be in an open position and positioned between the closed position and the fully open position. In an embodiment, a space is provided between ends of the shuttle supports 200 and the lower wall portion 80 and a space between the ridge and the sealing surface 204 is provided. Also, when the valve 68 is in an open position, the edge portion of the inboard face and an adjacent portion of the sealing surface 204 provide a portion within the assembly 30, 30A, 30B, 30C, 30D where the flow rate of the fluid is reduced when compared with other portions of the assembly 30, 30A, 30B, 30C, 30D such as, for example, adjacent opposite ends of the base perforation 96 or adjacent the second end 158 of the cap perforation 144 and ridge.

The base 206 may have a generally hemispherical shape (not depicted) or elongated cylindrical shape as is illustrated best in FIG. 5. However, it should be appreciated that the base may be of another shape. At least a portion of the base 206 has a diameter which is of a length that is greater than that of the retaining groove 208. An area between the base 206 and the shuttle 192 defines a shuttle cavity. The shuttle cavity is shaped to increase a drag force applied to the valve 68 by a fluid flowing adjacent thereto.

The retaining groove 208 separates the sealing surface 204 and the base 206 and is defined by the area therebetween. The plug member 194 is attached to the shuttle 192 by engaging the main portion 198 and the retaining groove 208. To assemble the valve 68, the base 206 is compressed, or pulled, and directed through the aperture 196 and the main portion 198 is aligned with the retaining groove 208.

The biasing member 66 is disposed between the base portion 62, 62A, 62B, 62C and the cap portion 64, 64A, 64B, 64C, 64D adjacent the cap perforation 144. The biasing member 66 contacts the shuttle 192 and applies a force thereto. The biasing member 66 applies the force to the shuttle 192 via contact with the plurality of shuttle supports 200. In an embodiment, a first member end of the biasing member 66 abuts each of the shuttle supports 200 and the second member end abuts the cap portion 64, 64A, 64B, 64C, 64D.

The biasing member 66 may be a compression spring such as, for example, a coil spring formed from spring steel. However, it should be appreciated that the biasing member 66 may be of another kind, type, make and/or formed from another material. The biasing member 66 is pretensioned. To open the valve 68, the biasing member 66 biases the valve 68 towards the lower wall portion 80 of the base portion 96.

As noted above, portions of the assembly 30, 30A, 30B, 30C, 30D are aligned with the centerline 54 thereof. The biasing member 66 may be aligned with the centerline 54 of the assembly. In the embodiments illustrated in FIGS. 3, 8 and 12, the biasing member 66 is aligned with the centerline 54 of the assembly 30, 30A, 30B and is in a perpendicular relationship with the centerline of the axle. In other embodiments, like those illustrated in FIGS. 15 and 19, the biasing member 66 is aligned with the centerline 54 of the assembly 30C, 30D and is in a parallel relationship with the centerline of the axle. When the biasing member 66 is in a parallel relationship with the centerline of the axle and the wheel assembly 34 is rotating, the centripetal forces acting on the biasing member 66 are reduced when compared to the forces acting on the biasing member 66 when it is in a perpendicular relationship with the centerline of the axle. Reducing the centripetal forces acting on the biasing member 66 is advantageous as it helps to prevent the valve 68 from moving to an open position when it is desired to maintain the valve 68 in the closed position.

In an embodiment, the assembly 30, 30A, 30B, 30C, 30D also comprises the filter 104. The filter 104 is utilized to prevent dirt and/or debris in the wheel assembly 34 from entering the assembly 30, 30A, 30B, 30C, 30D. The filter 104 may be conventional in the art.

As illustrated in FIG. 3, the valve 68 is in the closed position. In the closed position, the fluid passage through the assembly 30, 30A, 30B, 30C, 30D is not provided. When the valve 68 is in an open position such as, for example, the fully open position, the fluid passage is provided through the assembly 30, 30A, 30B, 30C, 30D. The fluid passage comprises the cap perforation 144, base perforation 96, the space between the ridge and the valve 68, space between the valve 68 and the outer wall portion 78 and one or more of the spaces 202 between the shuttle supports 184. In the embodiments illustrated in FIGS. 2-5, the fluid passage also comprises the fluid conduits 164, 178 provided through the nut 128 and the male-ended connector 172, respectively.

When a pressure differential between the pressure within the inflation system conduit 56 and the tire pressure is above an opening threshold, the valve 68 is in or placed in an open position. A relationship between an area A4 (hereinafter referred to as the fourth area and indicated in, for example, FIGS. 8 and 20), the spring rate of the biasing member 66, and the pressure differential between the pressure within the inflation system conduit 56 and the tire pressure determines the opening threshold and facilitates placing the valve 68 in an open position. The opening threshold may be about 5 psi or more. In an embodiment, the opening threshold is about 5 to about 8 psi. The assembly 30, 30A, 30B, 30C, 30D may be configured so that the valve 68 has a specific opening threshold. The valve 68 remains in an open position so long as the pressure differential between the pressure within the inflation system conduit 56 and the tire pressure is above the opening threshold. In an open position, the sealing surface 204 does not contact the cap portion 64, 64A, 64B, 64C, 64D which allows a flow of the pressurized fluid past the valve 68 from the base perforation 96 to the cap perforation 144 through the fluid passage or from the cap perforation 144 to the base perforation 96 through the fluid passage. In the embodiments illustrated, the fourth area A4 is defined by the sealing surface 204 and the ridge when the valve 68 is in the closed position and is of an unbroken circular shape. The location of the fourth area A4 is also shown, for example, in FIG. 5 of PCT/US2014/072037.

When a pressure differential between the tire pressure and the pressure within the inflation system conduit 56 is above a closing threshold, the valve 68 is in or placed in the closed position. The closing threshold is about 5 to about 8 psi. The assembly 30, 30A, 30B, 30C, 30D may be configured so that the valve 68 has a specific closing threshold. In the closed position, the plug member 194 sealingly contacts the cap portion 64, 64A, 64B, 64C, 64D which prevents a flow of the pressurized fluid from the cap perforation 144 to the base perforation 96 or vice versa. The valve 68 remains in the closed position until the central tire inflation system 32 determines that the tire pressure needs to be checked and/or adjusted.

Figure 8:
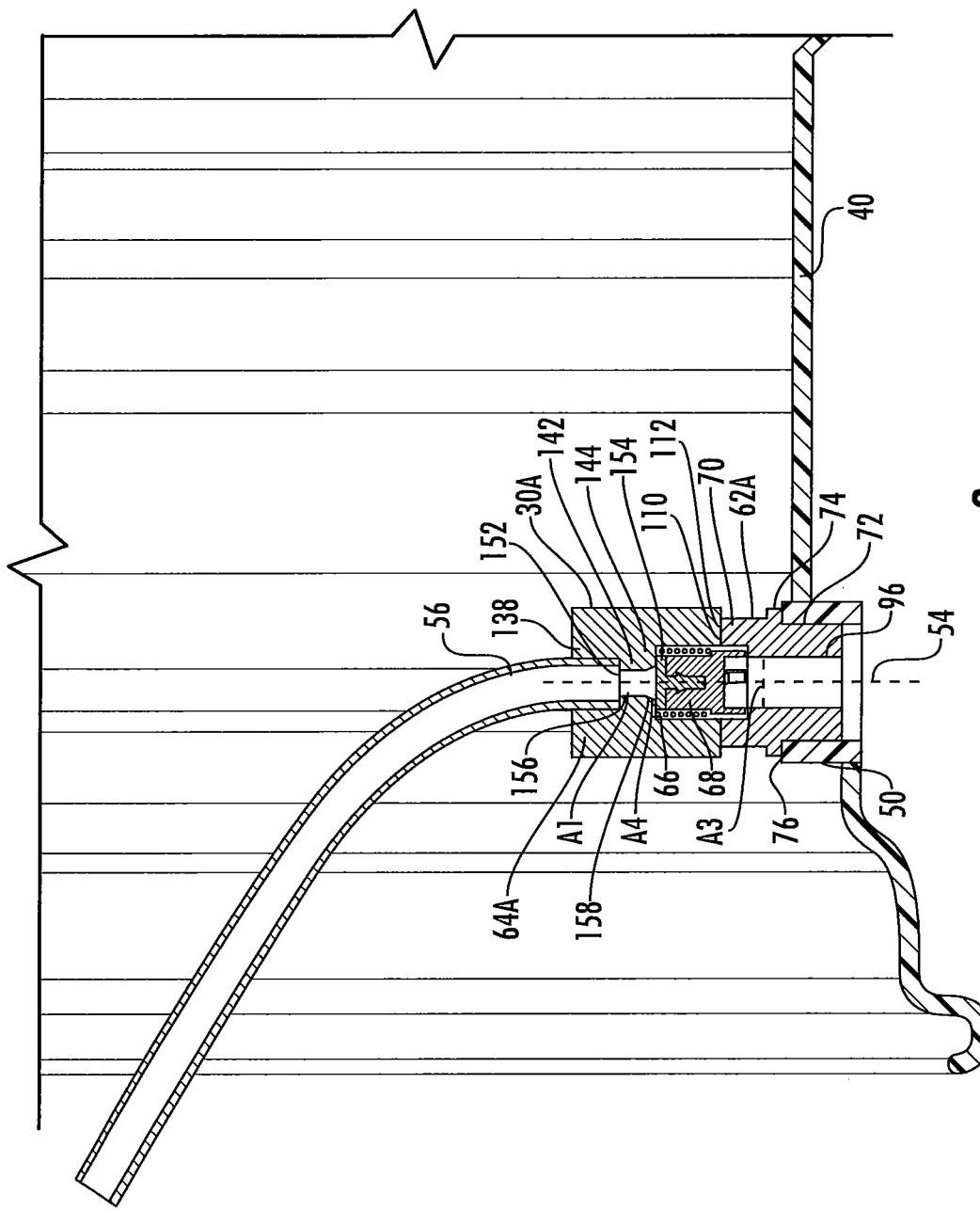
FIG. 8 depicts a sectional view of the assembly of FIG. 6.
Figure 9:
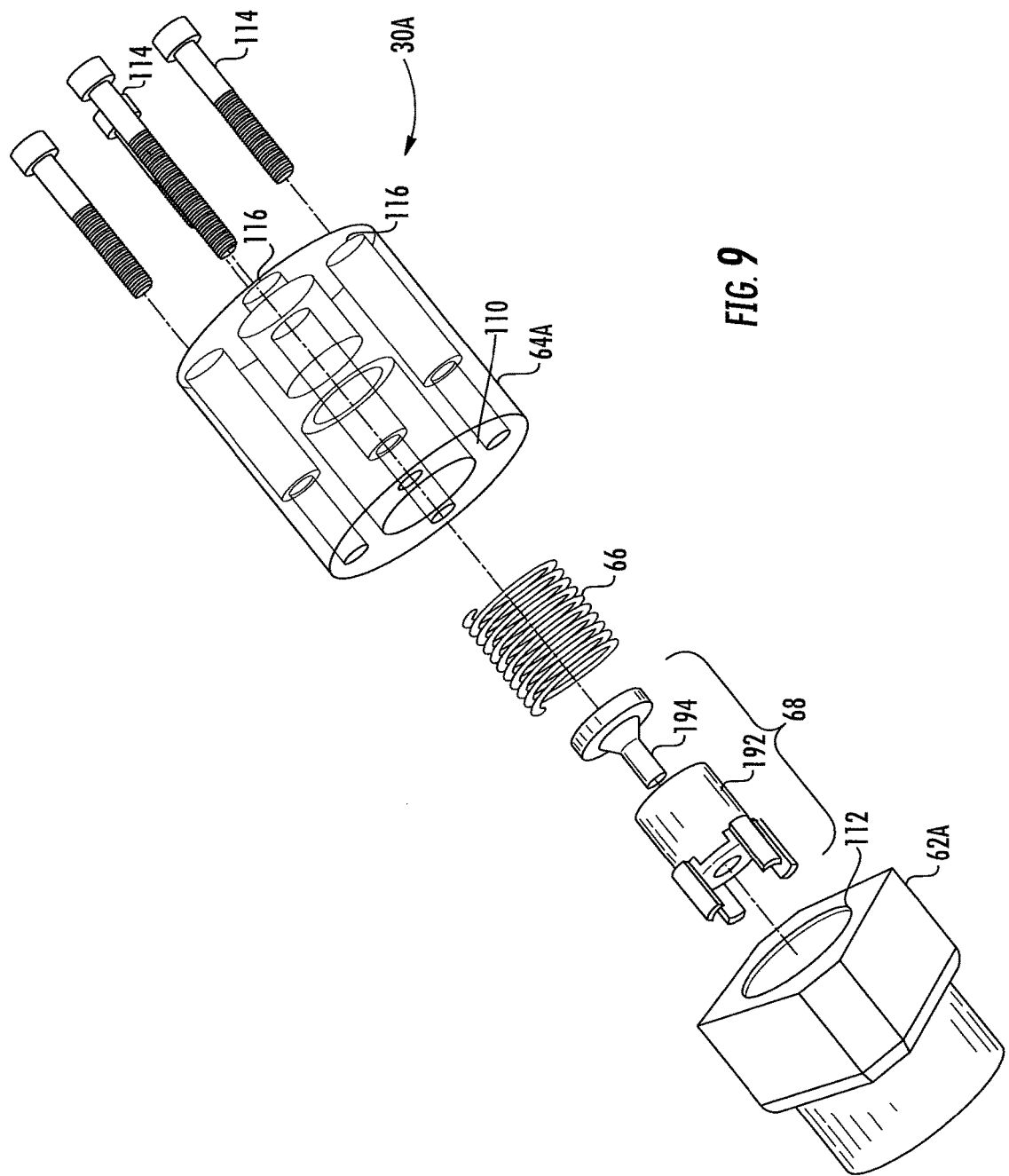
FIG. 9 depicts an exploded view of the portion of the assembly shown in FIG. 7.
Figure 20:
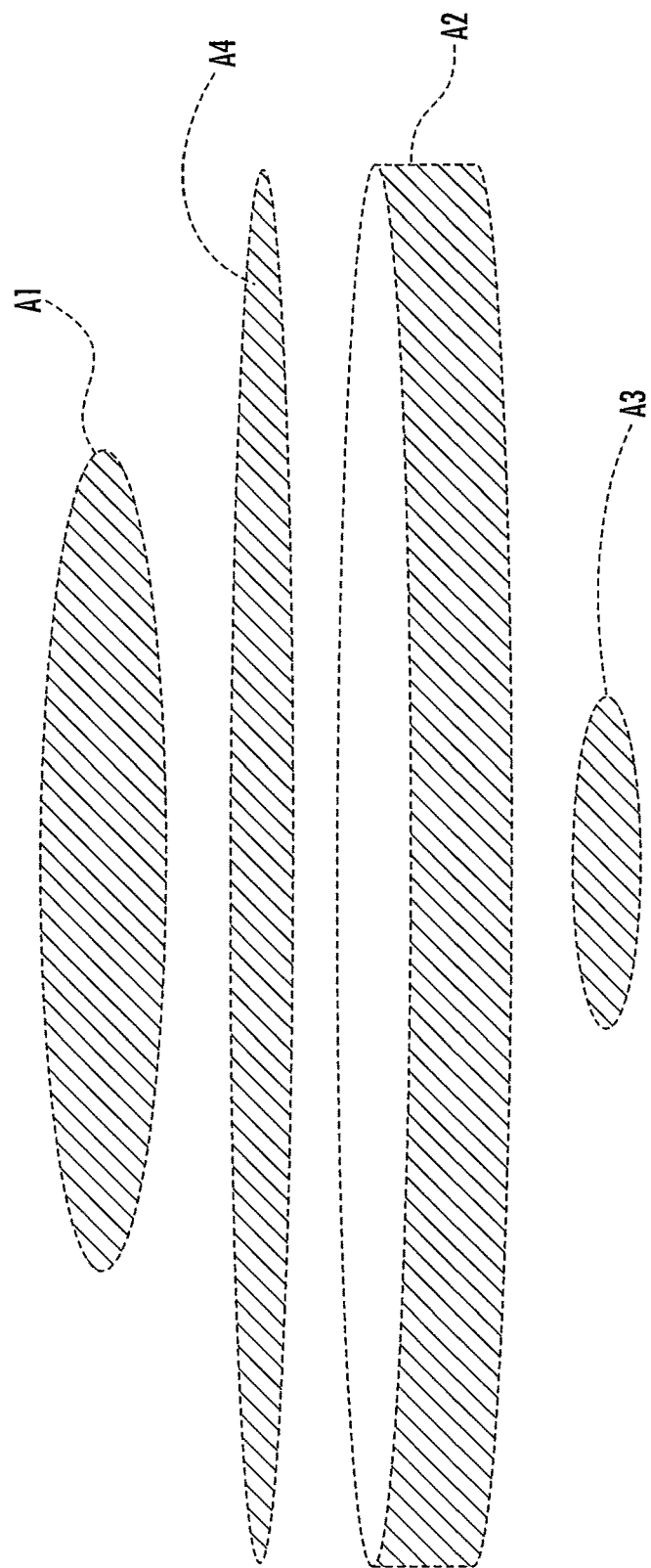
FIG. 20 depicts a perspective view of certain areas within the embodiments of the assembly of FIGS. 2, 6, 10, 13 and 16.

Referring to FIGS. 8 and 20, a relationship between an area A1 (hereinafter referred to as the first area) of the cap perforation 144, an area A2 (hereinafter referred to as the second area) between the sealing surface 204 and the ridge when the valve 68 is in an open position which corresponds to an area of a side of a right cylinder, and an area A3 (hereinafter referred to as the third area) of the reduced diameter of the base perforation 96 determines the closing threshold and facilitates placing the valve 68 in the closed position. The locations of the areas A1, A2, and A3 are also shown, for example, in FIG. 5 of PCT/US2014/072037. The first area A1 must be greater than the second area A2, and the third area A3 must be greater than the second area A2 to obtain a desirable closing threshold for use with the central tire inflation system 32. In an embodiment, the third area A3 is about 1.1 times greater than the second area A2 and the first area A1 is about 3.8 times greater than the second area A2. Such a selection of the areas A1, A2, and A3 results in the closing threshold of about 5 to about 8 psi. As above-discussed, when the valve 68 is in an open position, one or more spaces 202 between the shuttle supports 200 forms a portion of the fluid passage. A total cross sectional area of the spaces 202 between supports 200 is about equal to the first area A1. Also, the fourth area A4 is larger than the first area A1.

Advantageously, the assembly 30, 30A, 30B, 30C, 30D can operate in an efficient manner at a wider range of pressures than the known designs. For example, the assembly 30, 30A, 30B, 30C, 30D can operate at a fluid supply pressure and/or a tire pressures of about 5 psi to 125 psi. Further, the assembly 30, 30A, 30B, 30C, 30D does not suffer from diminished performance under certain ambient temperature conditions which is observed in the known designs. For example, placing the valve 68 in an open position or the closed position is not affected by low temperature conditions. Additionally, after the tire pressure is increased or decreased, the valve 68 can be placed in the closed position quickly to provide a desired tire pressure.

As noted above, the assembly 30, 30A, 30B, 30C, 30D is utilized in a tire inflation system to check, increase and/or decrease the tire pressure. The assembly 30, 30A, 30B, 30C, 30D may be utilized to increase or decrease the tire pressure to a selected tire pressure. For example, the tire pressure may be selected by an operator of the vehicle and be from about 5 to 125 psi.

As noted above, the valve 68 may be in a closed position or placed in the closed position. Also, under certain conditions, the valve 68 may be in an open position or placed in the open position. When it is desired to check, increase and/or decrease the tire pressure, the valve 68 is placed in an open position so that the wheel assembly 34 is in fluid communication with the assembly 30, 30A, 30B, 30C, 30D and the base perforation 96 and the inflation system conduit 56 is provided in fluid communication with the assembly 30, 30A, 30B, 30C, 30D via the cap perforation 144.

To place the valve 68 in an open position, a force is applied thereto via the pressurized fluid from the inflation system conduit 56 through the cap perforation 144. The drag force applied to the valve 68 and the force applied by the biasing member 66 to the shuttle 192 urges the valve 68 towards the lower wall portion 80 and causes the sealing surface 204 to no longer sealingly contact the ridge which forms the space therebetween and, when the valve 68 is in the fully open position, each of the shuffle supports 200 to abut the lower wall portion 80. The force applied by the biasing member 66 to the valve 68 and from the inflation system conduit 56 through the cap perforation 144 by the pressurized fluid from the cap perforation 144 to the fourth area A4 places the valve 68 in an open position and is greater than the force applied by tire pressure to the valve 68 through the base perforation 96. A spring rate or another characteristic of the biasing member 66 may be adjusted to facilitate placing the valve 68 in an open position when the pressurized fluid from the inflation system conduit 56 is a predetermined amount greater than the tire pressure.

The configuration of the base perforation 96, the cap perforation 144, the ridge, and the shuttle 192 may also facilitate placing the valve 68 in an open position. The base perforation 96, the cap perforation 144, and the ridge are shaped to militate against pressure losses that occur as a fluid flows through an orifice constriction. The outer edge of the main portion 198, the upper edges of the shuttle supports 200, and the shuttle cavity are shaped to increase a drag force applied to the valve 68 by a fluid flowing adjacent thereto. When the fluid flows from the cap perforation 144 to the base perforation 96, the fluid applies the drag force to the valve 68. The greater the pressure within the inflation system conduit 56, when compared to the tire pressure, the greater the drag force that is applied to the valve 68.

When it is desired to terminate increasing or decreasing the tire pressure, the valve 68 is placed in the closed position. To place the valve 68 in the closed position, a force is applied to the valve 68 by the tire pressure through the base perforation 96. The drag force applied to the valve 68 urges the valve 68 towards the cap portion 64, 64A, 64B, 64C, 64D which causes the sealing surface 204 to sealingly contact the ridge. The force applied to place the valve assembly 68 into the closed position is greater than a sum of a force applied by the biasing member 66 to the valve 68 via the shuttle 192 and the force applied by the pressurized fluid from the cap perforation 144. Further, the spring rate or other characteristic of the biasing member 66 may be adjusted to facilitate placing the valve 68 into the closed position when the pressurized fluid from the base perforation 96 is a predetermined amount greater than the pressurized fluid from the cap perforation 144.

The configuration of the base perforation 96, cap perforation 144, ridge, shuttle 192 and plug member 194 also facilitate placing the valve 68 in the closed position. The base perforation 96, cap perforation 144 and the ridge are shaped to militate against pressure losses that occur as a fluid flows through an orifice constriction. The outer edge of the main portion 198, the upper edges of the shuttle supports 200, and the shuttle cavity are shaped to increase a drag force applied to the valve 68 by a fluid flowing adjacent thereto. When the fluid flows from the base perforation 96 to the cap perforation 144, the fluid applies the drag force to the valve 68. The greater the tire pressure relative to the pressure within the inflation system conduit 56, the greater the drag force that is applied to the valve 68.

When the valve 68 is in an open position, the inflation system conduit 56 is in fluid communication with the wheel assembly 34 via the assembly 30, 30A, 30B, 30C, 30D. Fluid in the inflation system conduit 56 may be at a pressure which is greater or less than the tire pressure. When it is desired to increase the tire pressure, the fluid in the inflation system conduit 56 is at a pressure which is greater than the tire pressure. When it is desired to decrease the tire pressure, the tire pressure is at a pressure which is greater than the pressure that the fluid is at in the inflation system conduit 56.

Fluid is directed through the assembly 30, 30A, 30B, 30C, 30D via the cap perforation 144, about the valve 68 and via the base perforation 96 and vice versa. The fluid may be selectively provided at a first pressure and a second pressure within the assembly 30, 30A, 30B, 30C, 30D. When it is desired to place the valve 68 in an open position, the first pressure is greater than the second pressure of the fluid. In an embodiment, the first pressure is greater than the second pressure when the pressure of the fluid in the inflation system conduit 56 is at a pressure which is greater than the tire pressure. When it is desired to place the valve 68 in the closed position, the second pressure is greater than the first pressure. In an embodiment, the second pressure is greater than the first pressure when the tire pressure is at a pressure which is greater than the pressure of the fluid in the inflation system conduit 56. When the tire pressure is greater than the pressure of the fluid in the inflation system conduit 56 by 5 psi or more, the second pressure is greater than the first pressure such that the valve 68 is placed in the closed position.

The first pressure or second pressure of the fluid can be selectively provided in predetermined positions within the assembly 30, 30A, 30B, 30C, 30D. In this embodiment, the first pressure and second pressure of the fluid are exerted on separate surfaces of the valve 68. In an embodiment, the base portion 62, 62A, 62B, 62C, cap portion 64, 64A, 64B, 64C, 64D and valve 68 are structured to selectively provide the first pressure between the cap portion 64, 64A, 64B, 64C, 64D and valve 68 and provide the second pressure between the base portion 62, 62A, 62B, 62C and valve 68. Selecting the size of the first area A1, the second area A2 and the third area A3 allows the first pressure to be selectively provided between the cap portion 64, 64A, 64B, 64C, 64D and valve 68 and the second pressure to be selectively provided between the base portion 62, 62A, 62B, 62C and valve 68. In an embodiment, the first area A1 is selected to be greater than the second area A2 and the third area A3 is selected to be greater than the second area A2. Also, in this embodiment, the first area A1 is defined by a space in the cap perforation 144, the second area A2 is defined by a space provided between the valve 68 and the cap portion 64, 64A, 64B, 64C, 64D, and the third area A3 is defined by a space in the base perforation 96.

When it is desired to place the valve 68 in an open position to check, increase and/or decrease the tire pressure, the valve 68 is urged toward the base portion 62, 62A, 62B, 62C by forces applied by the biasing member 66 and the first pressure of the fluid. In an embodiment, the first pressure is greater than the second pressure of the fluid. Also, in these embodiments, the sum of the forces applied to the valve 68 by the first pressure of the fluid and the biasing member 66 are greater than that of the sum of the forces applied on the valve 68 by the second pressure of the fluid. As the valve 68 is urged toward the base portion 62, 62A, 62B, 62C, the biasing member 66 which is positioned between the cap portion 64, 64A, 64B, 64C, 64D and valve 68 extends toward the base portion 62, 62A, 62B, 62C. The biasing member 66 may extend until the shuttle supports 200 contact the base portion 62, 62A, 62B, 62C.

After the tire pressure is checked, increased and/or decreased to the desired pressure, the valve 68 is placed into the closed position by urging the valve 68 toward the cap portion 64, 64A, 64B, 64C, 64D. When it is desired to place the valve 68 in the closed position, the second pressure is greater than the first pressure of the fluid. Also, in these embodiments, the force applied on the valve 68 by the second pressure of the fluid is greater than the sum of the forces applied on the valve 68 by the first pressure of the fluid and the force applied by the biasing member 66. As the valve 68 is urged toward the cap portion 64, 64A, 64B, 64C, 64D, the biasing member 66 is compressed until the sealing surface 204 sealingly contacts the cap portion 64, 64A, 64B, 64C, 64D.

The valve 68 can be placed into the closed position from an open position so that the inflation system conduit 56 does not communicate with the wheel assembly 34 via the assembly 30, 30A, 30B, 30C, 30D. When this is desired, the fluid may be at three or more discrete flow rates within the assembly 30, 30A, 30B, 30C, 30D. In an embodiment, the fluid is at first flow rate, a second flow rate and a third flow rate. The first flow rate may be greater than the second flow rate, and the third flow rate may be greater than the second flow rate. In other embodiments, the third flow rate is greater than the first flow rate.

In an embodiment, the fluid is at the first flow rate in the cap portion 64, 64A, 64B, 64C, 64D, at the second flow rate adjacent the valve 68 and at the third flow rate in the base portion 62, 62A, 62B, 62C. In another embodiment, the fluid in the cap perforation 144 is at the first flow rate, the fluid between the cap portion 64, 64A, 64B, 64C, 64D and valve 68 is at the second flow rate and the fluid in the base perforation 96 is at the third flow rate. The fluid in the cap perforation 144 is at the first flow rate as it passes through the first area A1, the fluid between the cap portion 64, 64A, 64B, 64C, 64D and valve 68 is at the second flow rate as it passes through the second area A2, and the fluid in the base perforation 96 is at the third flow rate as it passes through the third area A3.

Providing the fluid at the aforementioned flow rates in the aforementioned locations within the assembly 30, 30A, 30B, 30C, 30D generates discrete fluid pressures within the assembly 30, 30A, 30B, 30C, 30D. In an embodiment, the fluid is at the first pressure between the cap portion 64, 64A, 64B, 64C, 64D and valve 68 and the second pressure between the base portion 64, 64A, 64B, 64C, 64D and the valve 68. The second pressure applies a force on the valve 68 which is opposite the force applied on the valve 68 by the biasing member 66 and the first pressure. In an embodiment, the force applied by the second pressure is greater than the sum of the other forces applied on the valve 68 which enables the valve 68 to close. In this embodiment, the second pressure may be greater than the first pressure by 5 psi or more.

To place the valve 68 in the closed position, the valve 68 is urged toward the cap portion 64, 64A, 64B, 64C, 64D by the third pressure. When the plug member 194 sealingly contacts the ridge, the valve 68 is closed. When the valve 68 is closed, fluid communication through the assembly 30, 30A, 30B, 30C, 30D is prevented.

In another embodiment, as illustrated in FIGS. 6-9, a valve assembly 30A comprises the inflation system conduit 56, a cap portion 64A, a base portion 62A, the valve 68, the biasing member 66, one or more fasteners 114, and the mounting portion 50.

In embodiment, as illustrated in FIGS. 6-19, the inflation system conduit 56 is in direct fluid communication with the assembly 30A, 30B, 30C, 30D via the cap portion 64A, 64B, 64C, 64D. In these embodiments, the inflation system conduit 56 is coupled with and extends into the cap portion 64A, 64B, 64C, 64D.

The cap portion 64A is a generally cylindrical member and comprises a fluid conduit 144 disposed parallel to and concentric with a longitudinal axis of the cap portion 64A. The cap portion 64A fluid conduit 144 is shaped to militate against pressure losses that occur as a fluid flows through an orifice constriction, and to set a relative flow rate for the fluid as it is directed through the valve assembly 30A.

Referring now to FIG. 8, the cap portion 64A perforation 144 may have a first portion 156 which has a diameter of a length that is substantially constant and a second portion 158 which has a diameter of a length which varies. The first portion 156 may be of a cylindrical shape. The second portion 158 is defined by a rounded portion of the center wall portion 142 and gradually increases in diameter to a ridge provided on an inboard face of the center wall portion 142. The ridge is preferably as described in WO 2014/028142 and PCT/US2014/072037, the entire disclosures of which are hereby incorporated by reference.

The diameter of the second portion 158 is greater than the diameter of the first portion 156. Alternatively, the cap perforation 144 may be of or defined by other shapes that militate against pressure losses that occur as a fluid flows through an orifice constriction. For example, in an embodiment (not depicted), the second portion may be defined by a pair of circular fillets formed in the wall portion and the inboard face of the center wall portion 142. In still other embodiments (not depicted), the first portion and/or second portion may be defined by other conic sections. Furthermore, it should be understood that the center wall portion may include at least one additional feature to facilitate applying a pressurized fluid such as air to the base cavity. In certain embodiments (not depicted), the at least one additional feature may be one of a hollow cylindrical protuberance extending from the center wall portion, a thread formed in the center wall portion, or a fitting adapted to receive a coupling.

The ridge is formed about and abuts the second end 154 of the cap perforation 144. The ridge is shaped to militate against pressure losses that occur as a fluid flows through an orifice constriction. The ridge is an annular body and is hemispherical in cross-section. However, it should be appreciated that the cross-sectional shape of the ridge may be of another shape.

The inboard face of the center wall portion 142 comprises a first surface. The first surface may be an annular portion that is attached to the ridge. The first surface separates the ridge from the groove. In certain embodiments, the inboard face also comprises a second surface which defines a portion of the groove. The first surface and second surface are attached to each other in a manner which provides the inboard face of the center wall portion 142 with a sharply defined edge portion.

The cap portion 64A further comprises one or more fastener bores 116. The valve 68 is disposed inside the cap portion 64A and the base portion 62A. The valve 68 comprises the features described above. The biasing member 66 is disposed around and concentric with the valve 68. A first end of the biasing member 66 applies force to the shuttle 192 via engagement with the plurality of shuttle supports 200. A second end of the biasing member 66 abuts the cap portion 64A.

The base portion 62A comprises a first cylindrically-shaped portion 70 and a second cylindrically-shaped portion 72. In an embodiment, the first cylindrically-shaped portion 70 may be of a diameter which is greater than a diameter of the second cylindrically-shaped portion 72. The diameter of the first cylindrically-shaped portion 70 and the diameter of the second cylindrically-shaped portion 72 may each be substantially constant. Also, an annular protrusion 74 is disposed between the first cylindrically-shaped portion 70 and the second cylindrically-shaped portion 72. When the assembly 30A is in use, the annular protrusion 74 abuts a mating surface 76 of the mounting portion 50. In this embodiment, the second cylindrically-shaped portion 72 is surrounded by and extends through a portion of the wheel rim 40.

The first cylindrically-shaped portion 70 further comprises one or more fastener bores, whereby fasteners 114 extending through the fastener bores 116 of the cap portion 64A couple the base portion 62A with the cap portion 64A. In an embodiment, a seal member (not depicted) may be provided between the cap portion 64A, 64B, 64C, 64D and base portion 62A, 62B, 62C so that fluid does not escape between the end surfaces 110, 112 of the base portion 62A, 62B, 62C and cap portion 64A, 64B, 64C, 64D. The seal member may be, for example, an O-ring.

In certain embodiments, as illustrated in FIGS. 6-19, a seal member (not depicted) may be provided between the assembly 30A, 30B, 30C, 30D and the mounting portion 50B, 50C. The seal member may be, for example, an O-ring which provides a fluid tight seal between the assembly 30A, 30B, 30C, 30D and the mounting portion 50B, 50C, 50D. In these embodiments, the seal member may be disposed at the first end 100 of the housing 60A, 60B, 60C, 60D.

In certain embodiments, like those illustrated in FIGS. 6-19, the cap portion 64A, 64B, 64C, 64D and base portion 62A, 62B, 62C each have an end surface 110, 112 which abuts a corresponding end surface 110, 112 of the base portion 62A, 62B, 62C or cap portion 64A, 64B, 64C, 64D. The cap portion 64A, 64B, 64C, 64D may be secured to the base portion 62A, 62B, 62C by one or more securing members 114. Each securing member 114 is provided in a hole 116 formed in the cap portion 64A, 64B, 64C, 64D and extends into the base portion 62A, 62B, 62C to secure the cap portion and base portion together as is illustrated in, for example, FIGS. 9 and 16. In an embodiment, a seal member (not depicted) may be provided between the cap portion 64A, 64B, 64C, 64D and base portion 62A, 62B, 62C so that fluid does not escape between the end surfaces 110, 112 of the base portion 62A, 62B, 62C and cap portion 64A, 64B, 64C, 64D. The seal member may be, for example, an O-ring.

Figure 10:
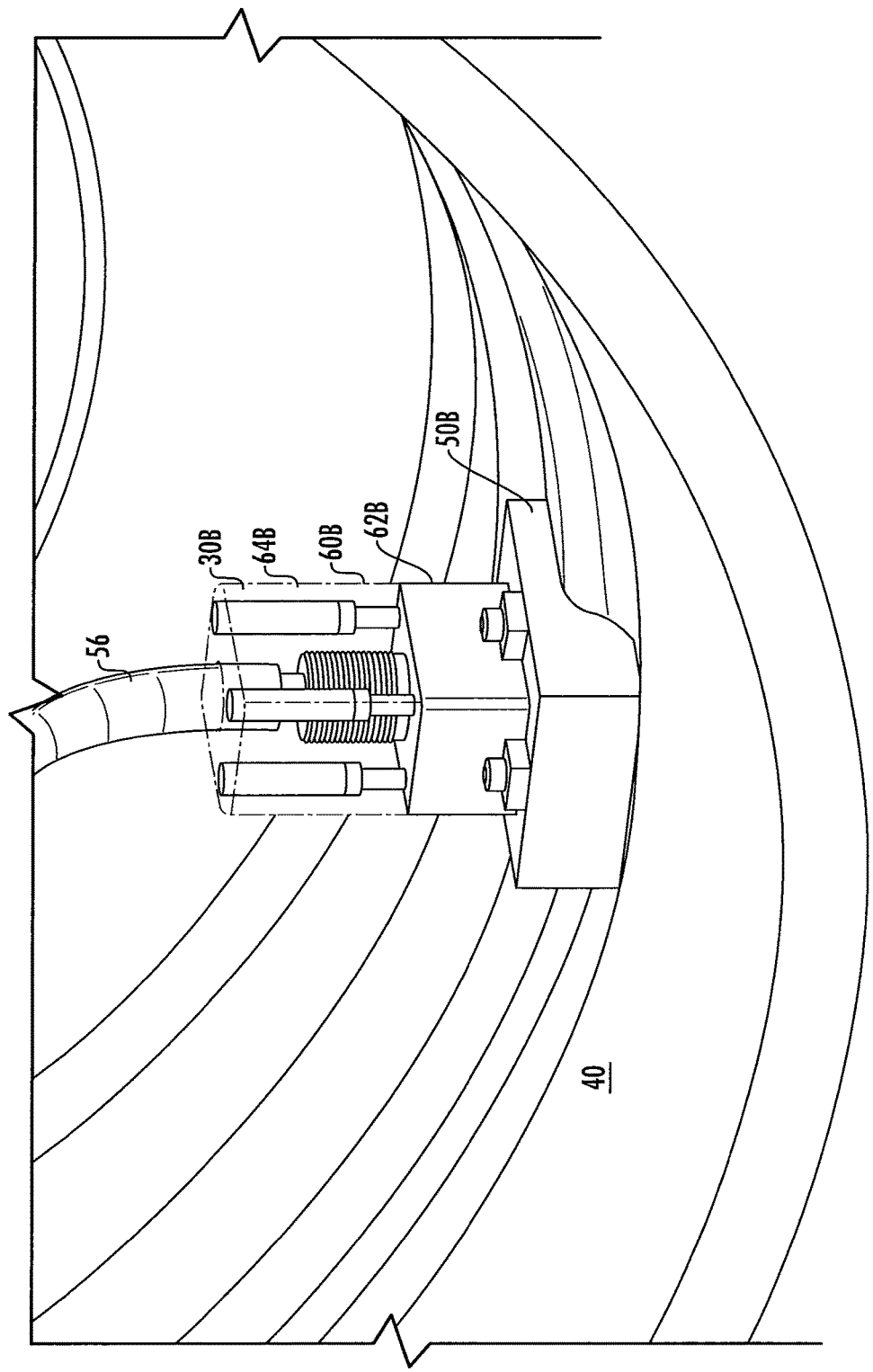
FIG. 10 depicts a perspective view of another embodiment of the assembly in accordance with the invention.
Figure 11:
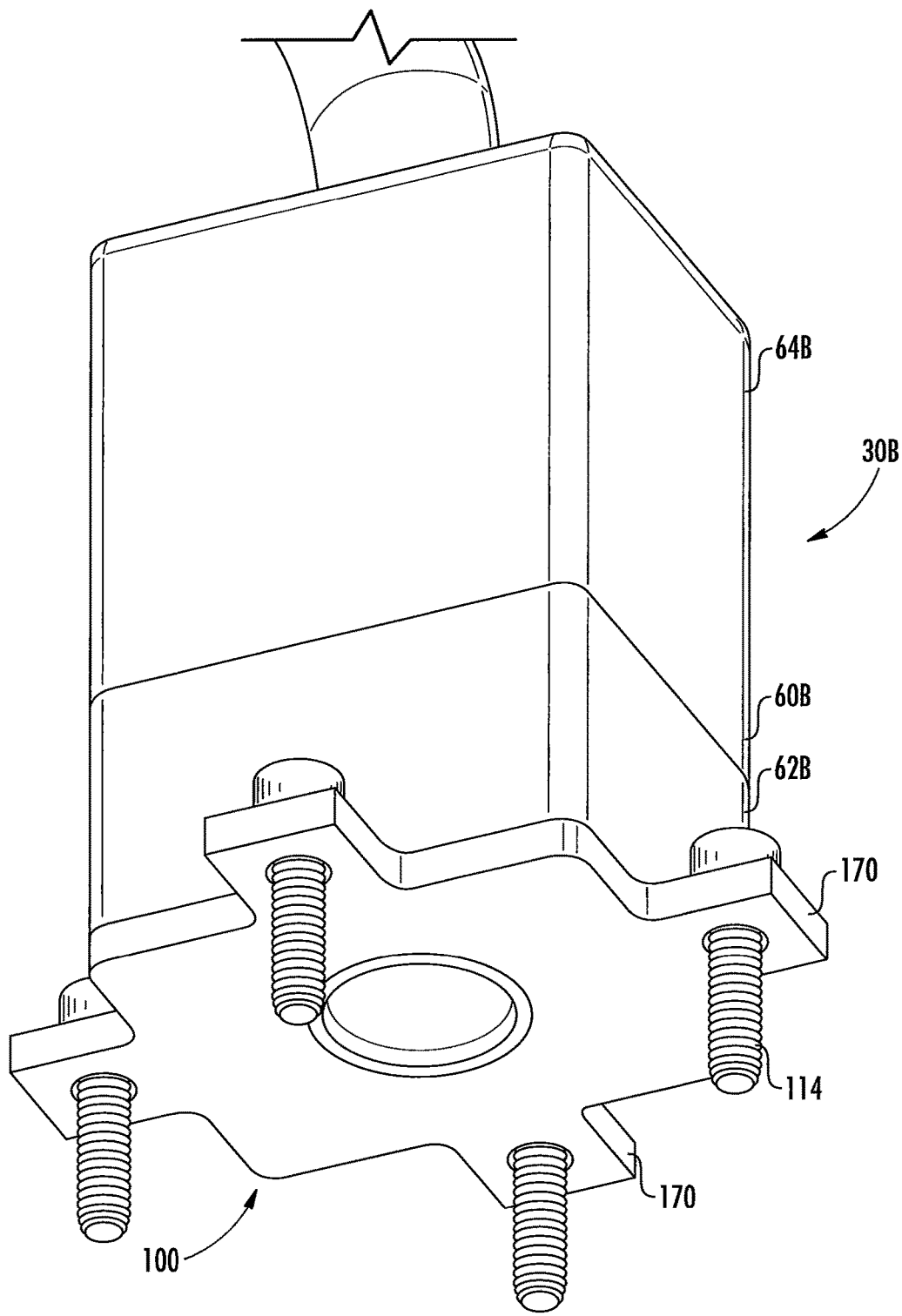
FIG. 11 depicts a perspective view of a portion of the assembly of FIG. 10.
Figure 12:
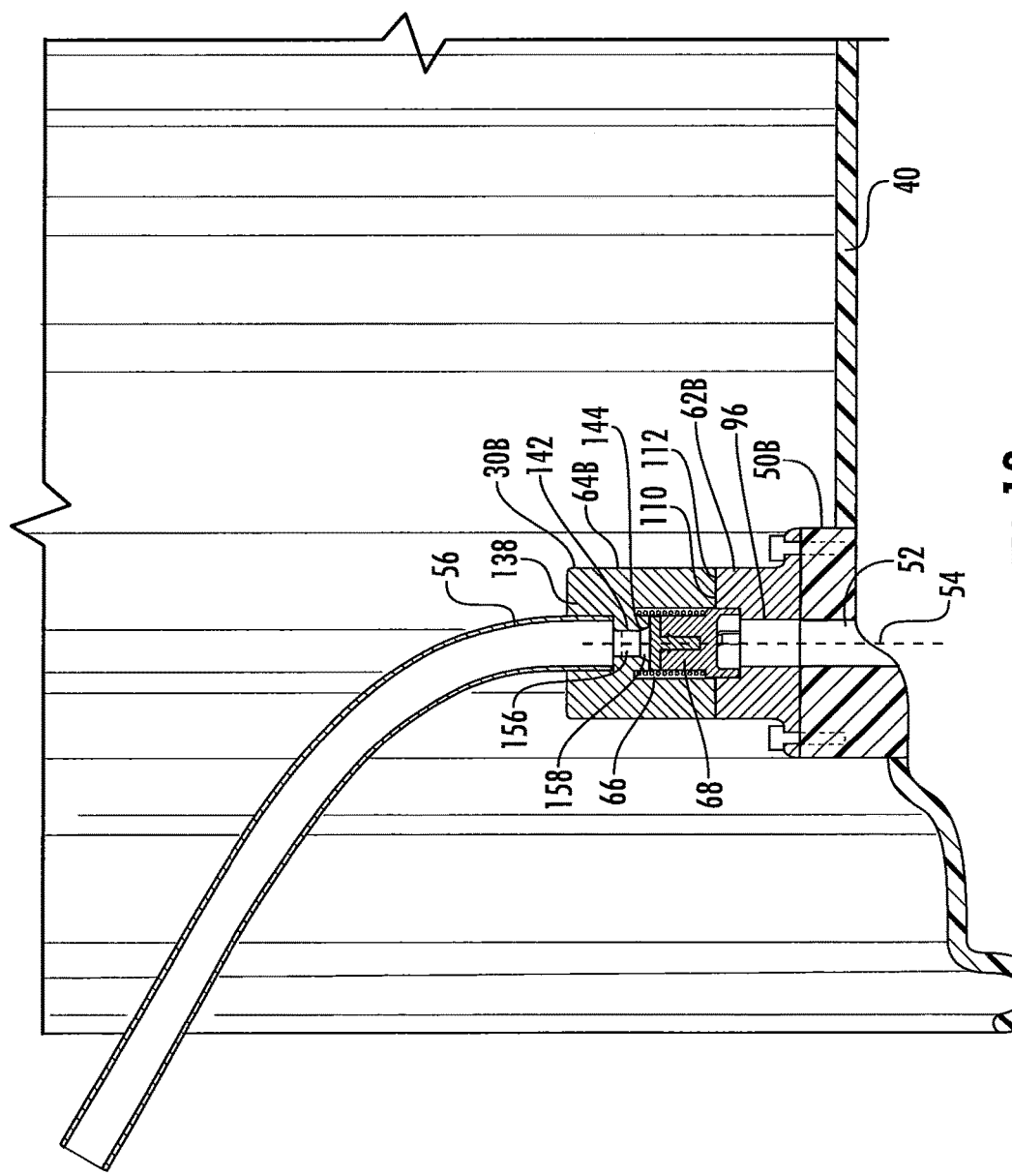
FIG. 12 depicts a sectional view of the assembly of FIG. 10.

In certain embodiments, as illustrated in FIGS. 10-19, the base portion 62B, 62C is a generally rectangular-shaped member. Referring now to FIGS. 10-12, in an embodiment, a valve assembly 30B comprises the inflation system conduit 56, a cap portion 64B, a base portion 62B, the valve 68, the biasing member 66, one or more fasteners 114, and a mounting portion 50B.

As illustrated in FIGS. 10-12, in an embodiment, the cap portion 64B and the base portion 62B comprise substantially rectangular geometries. An end of the conduit 56 is disposed in, and coupled with, a bore in an end of the cap portion 64B. The conduit 56 is in fluid communication with the perforation 144. Similarly to the embodiment illustrated in FIGS. 6-9, the embodiment illustrated in FIGS. 10-12 comprises the cap portion 64A perforation 144 having a first portion 156 which has a diameter of a length that is substantially constant and a second portion 158 which has a diameter of a length which varies. The first portion 156 may be of a cylindrical shape. The second portion 158 is defined by a rounded portion of the center wall portion 142 and gradually increases in diameter to a ridge provided on an inboard face of the center wall portion 142. The ridge is preferably as described in WO 2014/028142 and PCT/US2014/072037, the entire disclosures of which are hereby incorporated by reference.

The base portion 62B comprises a plurality of protrusions 170 disposed at the first end 100 thereof. Fasteners 114 disposed through the protrusions 170 couple the base portion 62B with the mounting portion 50B. The base portion 62B includes the perforation 96 therethrough. The perforation 96 is provided in fluid communication with the fluid channel 52 formed through the mounting portion 50B and the wheel rim 40. The mounting portion 50B comprises a substantially rectangular module. However, a surface of the mounting portion 50B coupled with the wheel rim 40 may be contoured to mate therewith.

Figure 13:
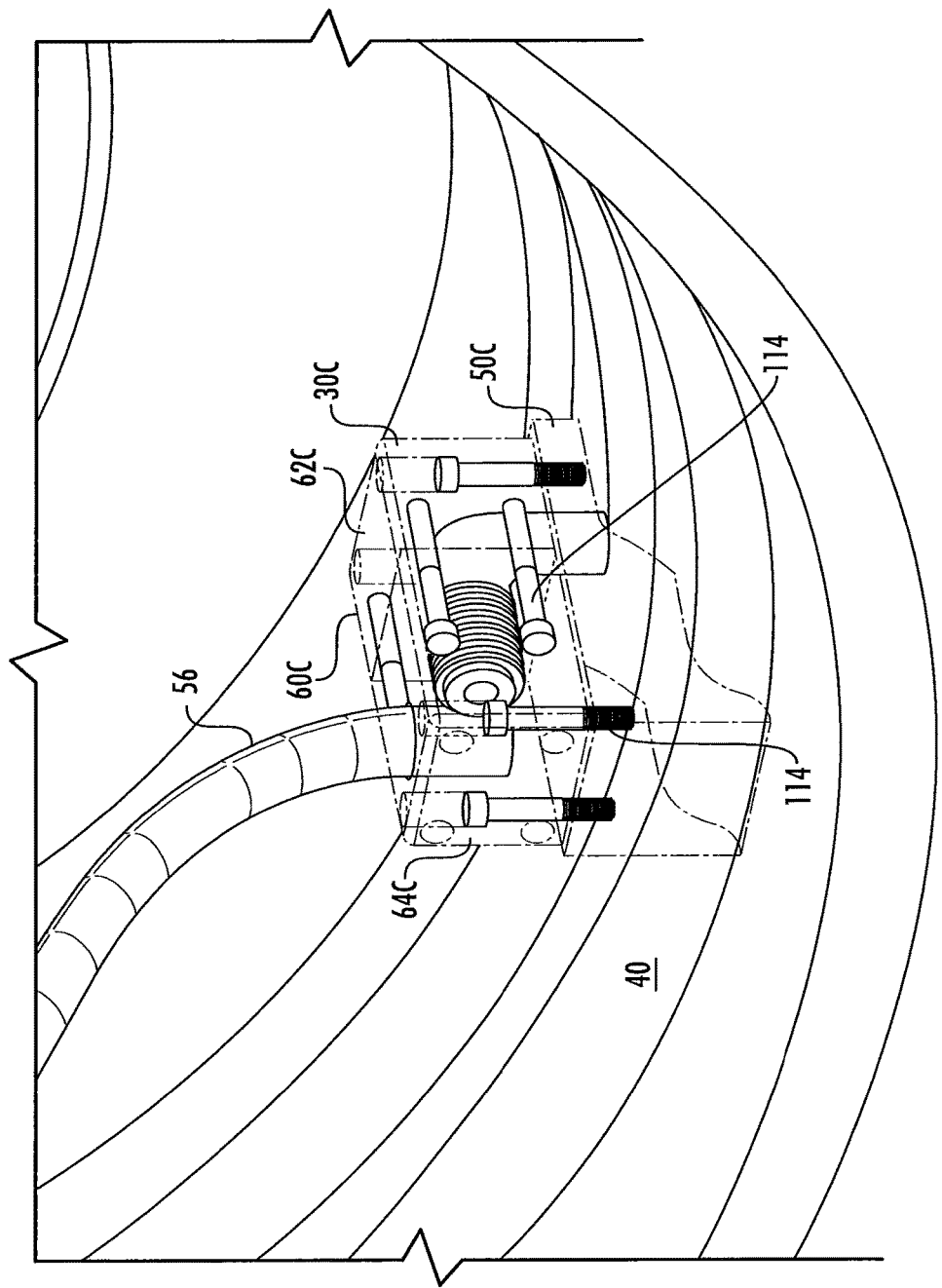
FIG. 13 depicts a perspective view of another embodiment of the assembly in accordance with the invention.
Figure 14:
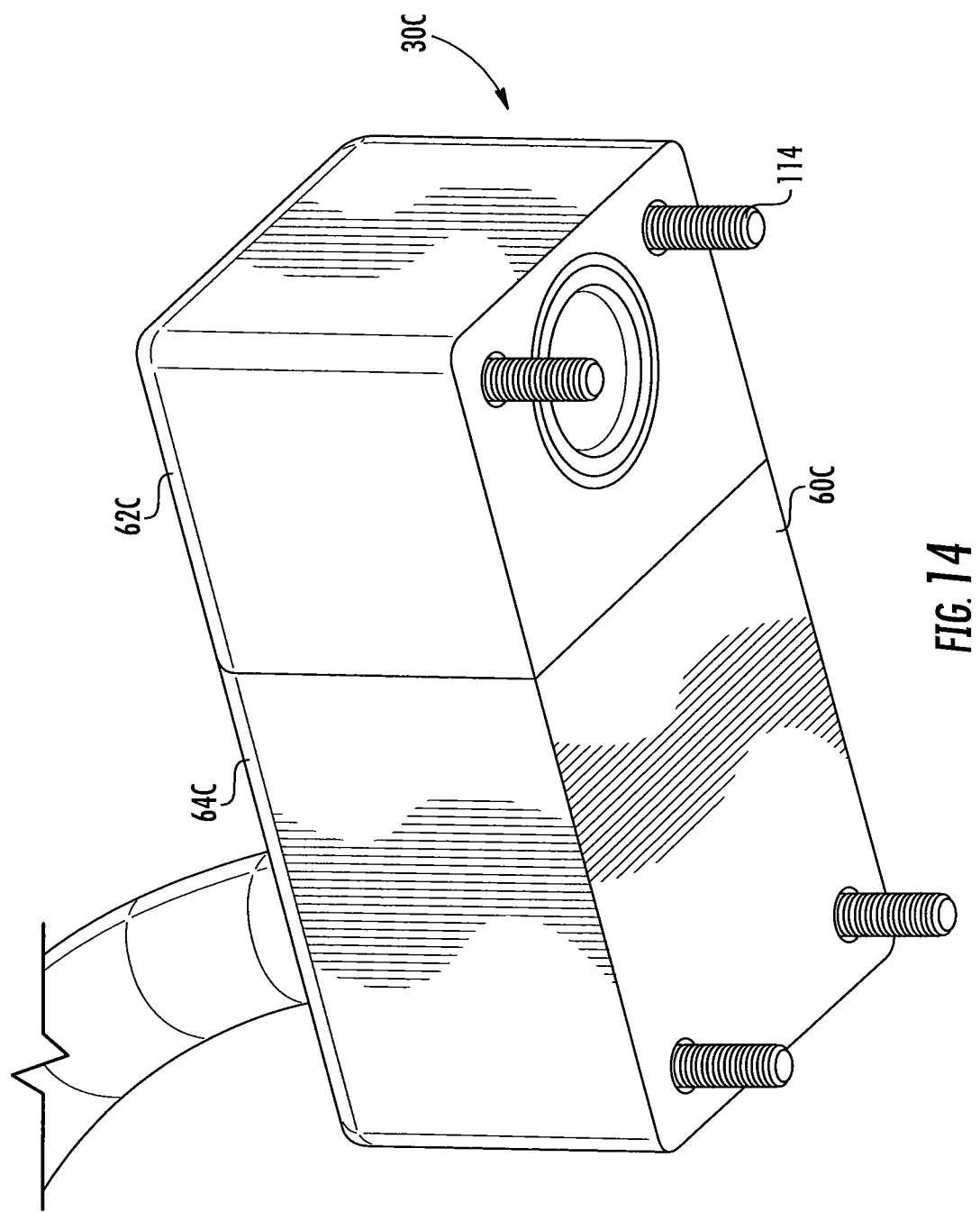
FIG. 14 depicts a perspective view of a portion of the assembly of FIG. 13.
Figure 15:
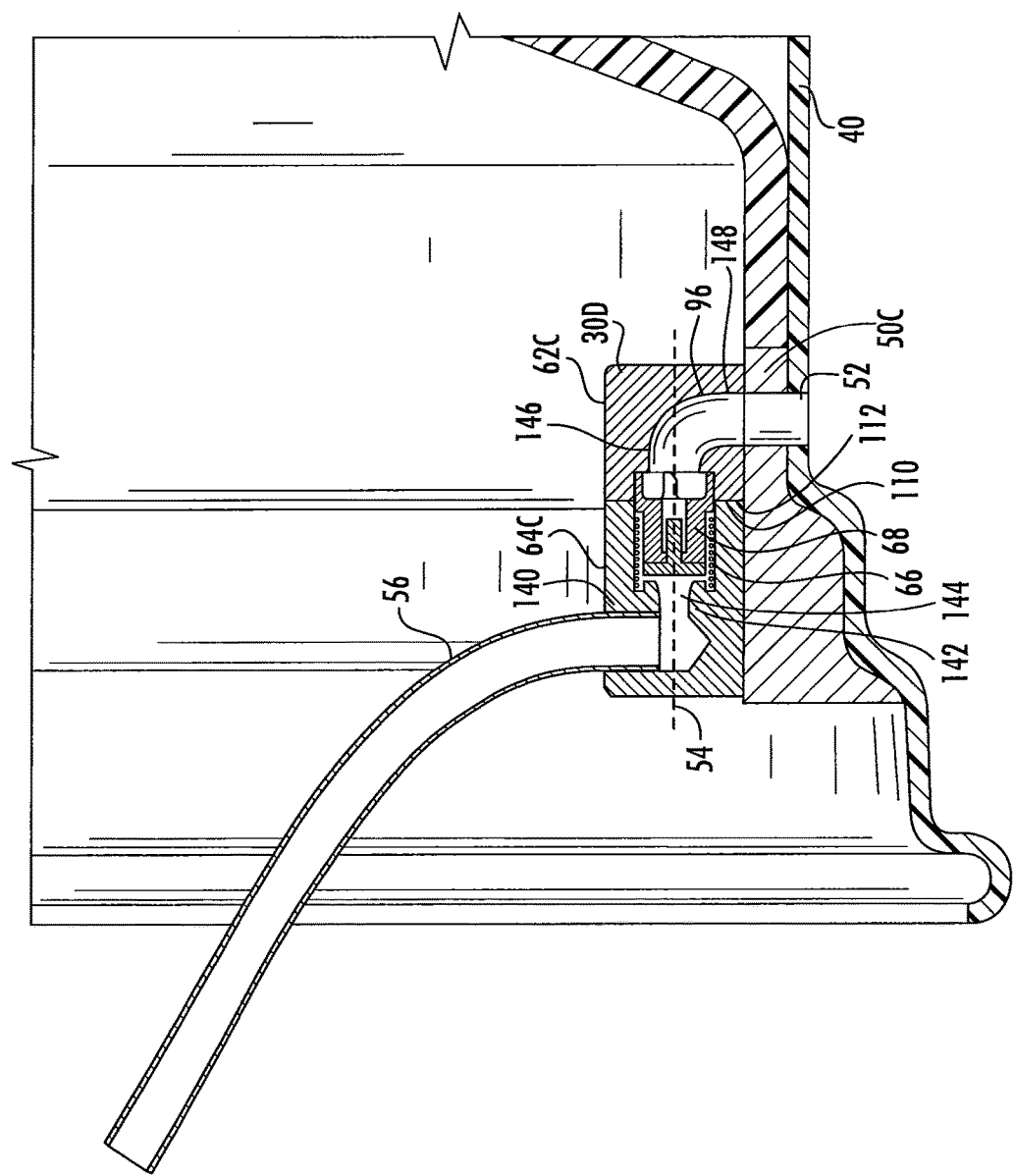
FIG. 15 depicts a sectional view of the assembly of FIG. 13.

In another embodiment, as illustrated in FIGS. 13-15, an assembly 30C comprises the inflation system conduit 56, a cap portion 64C, a base portion 62C, the valve 68, the biasing member 66, a plurality of fasteners 114, and the mounting portion 50C. The cap portion 64C and the base portion 62C comprise substantially rectangular geometries. The valve 68 is disposed inside the cap portion 64C and the base portion 62C, the valve 68 having a longitudinal axis parallel with the longitudinal axis of the wheel assembly 34.

The cap portion 64C may be secured to the base portion 62C by one or more fasteners 114. Each fastener 114 is provided in a hole 116 formed in the cap portion 64C and extends into the base portion 62C to secure the cap portion 64C and base portion 62C together. The cap portion 64C and the base portion 62C are also coupled with the mounting portion 50C via one or more fasteners 114 provided in holes 116 perpendicular to a longitudinal axis 54 of the assembly 30C.

The inflation system conduit 56 is coupled with and extends into a side wall portion 140 of the cap portion 64C. The conduit 56 is in fluid communication with the cap portion 64C perforation 144. The portion of conduit 56 extending into the cap 64C is aligned perpendicular to the longitudinal axis 54 of the assembly 30C and the perforation 144, the valve 68, and an upper portion 146 of the base portion 62C perforation 96. The base portion 62C perforation 96 may be formed with a 90° bend. In an embodiment, the cap perforation 144 is aligned with the upper portion 146 of the base perforation 96 and is in a perpendicular relationship with a lower portion 148 of the base perforation 96. Also, the base perforation 96 is provided in fluid communication with the fluid channel 52 formed through the mounting portion 50C and the wheel rim 40.

Similarly to the embodiment illustrated in FIGS. 6-9, the embodiment illustrated in FIGS. 13-15 comprises the cap portion 64C perforation 144 having a first portion 156 which has a diameter of a length that is substantially constant and a second portion 158 which has a diameter of a length which varies. The first portion 156 may be of a cylindrical shape. The second portion 158 is defined by a rounded portion of the center wall portion 142 and gradually increases in diameter to a ridge provided on an inboard face of the center wall portion 142. The ridge is preferably as described in WO 2014/028142 and PCT/US2014/072037, the entire disclosures of which are hereby incorporated by reference.

As illustrated in FIGS. 13-15, when the biasing member 66 is in a parallel relationship with the centerline of the axle and the wheel assembly 34 is rotating, the centripetal forces acting on the biasing member 66 are reduced when compared to the forces acting on the biasing member 66 when it is in a perpendicular relationship with the centerline of the axle. Reducing the centripetal forces acting on the biasing member 66 decreases the likelihood that the valve 68 will move to an open position when it is desired to maintain the valve 68 in the closed position.

In another embodiment, as illustrated in FIGS. 16-19, an assembly 30D comprises the inflation system conduit 56, a cap portion 64D, a base portion 62D, the valve 68, the biasing member 66, a plurality of fasteners 114, and the mounting portion 50D. The assembly 30D comprises the features and characteristics described in relation to the embodiment illustrated in FIGS. 13-15, with the exception of the coupling of the conduit 56 and the cap portion 64D. The inflation system conduit 56 is coupled with and extends into an upper wall portion 138 of the cap portion 64D (similar to the coupling of a conduit 56 and the cap portion 64A, 64B).

While various embodiments of the presently disclosed subject matter have been described above, it should be understood that they have been presented by way of example, and not limitation. It will be apparent to persons skilled in the relevant art(s) that the disclosed subject matter may be embodied in other specific forms without departing from the spirit or essential characteristics thereof. The embodiments described above are therefore to be considered in all respects as illustrative—not restrictive.

What is claimed is:

1. A tire inflation system for a vehicle, comprising:
   a wheel rim having a radially interior surface and a radially exterior surface, wherein an aperture extends through said exterior surface and said interior surface;
   a fluid supply;
   a wheel valve assembly operable between an open position and a closed position, comprising:
      a mounting portion coupled with said interior surface of said wheel rim, wherein said mounting portion includes an opening therethrough in fluid communication with said wheel rim aperture,
      a cap portion coupled with said mounting portion disposed radially inward of said wheel rim interior surface, wherein said cap portion defines a fluid inlet and a perforation in fluid communication,
      a fluid conduit in fluid communication with said fluid supply and said cap portion fluid inlet,
      a valve at least partially disposed within said cap portion, wherein said valve comprises a longitudinal axis parallel with said longitudinal axis of said wheel rim,
      a base portion coupled with said cap portion and disposed radially inward of said wheel rim interior surface, wherein said base portion at least partially surrounds said valve,
      a fluid outlet defined by said base portion, wherein said fluid outlet is in selective fluid communication with said fluid inlet via said valve, and
      a biasing member disposed at least partially around said valve, wherein an end of said biasing member abuts a portion of said valve, whereby said biasing member is compressed in said wheel valve assembly closed position.

2. The tire inflation system of claim 1, wherein said cap portion includes a first plurality of fastener apertures disposed substantially transverse a longitudinal axis of said wheel rim,
   said cap portion coupled with said mounting portion via a plurality of fasteners disposed through said first plurality of fastener apertures.

3. The tire inflation system of claim 1, wherein said cap portion fluid inlet comprises a longitudinal axis disposed transverse said longitudinal axis of said wheel rim.

4. The tire inflation system of claim 1, wherein said cap portion perforation comprises a longitudinal axis parallel with a longitudinal axis of said cap portion.

5. The tire inflation system of claim 1, wherein the area formed in said cap portion perforation varies in size.

6. The tire inflation system of claim 1, said cap portion further comprising:
   a substantially cylindrical chamber in fluid communication with said fluid inlet and said perforation, wherein said chamber comprises a longitudinal axis parallel with said longitudinal axis of said wheel rim.

7. The tire inflation system of claim 6, wherein said chamber longitudinal axis is disposed transverse said longitudinal axis of said fluid inlet.

8. The tire inflation system of claim 6, wherein said fluid outlet defines a curve having a substantially 90 degree angle.

9. The tire inflation system of claim 1, wherein said cap portion comprises a second plurality of fastener apertures disposed substantially parallel to a longitudinal axis of said wheel rim,
   said cap portion coupled with said base portion via a plurality of fasteners disposed through said second plurality of fastener apertures.

10. The tire inflation system of claim 9, wherein said fluid conduit is coupled with a side wall portion of said cap portion.

11. The tire inflation system of claim 9, wherein said fluid conduit is coupled with an upper wall portion of said cap portion.

12. The tire inflation system of claim 1, wherein said base portion includes a third plurality of fastener apertures disposed substantially transverse a longitudinal axis of said wheel rim,
   said base portion coupled with said mounting portion via a plurality of fasteners disposed through said third plurality of fastener apertures.

13. The tire inflation system of claim 12, wherein said plurality of fastener apertures are disposed through a plurality of protrusions on said base portion.

14. A tire inflation system for a vehicle, comprising:
   a valve assembly coupled with a wheel assembly, said valve assembly in fluid communication with a fluid reservoir and operable between an open position and a closed position,
   said valve assembly comprising a mounting portion connected to an interior surface of a wheel rim, said wheel rim including an aperture extending from an exterior surface to an interior surface thereof,
   said mounting portion comprising an aperture therethrough in fluid communication with said wheel rim aperture,
   a cap portion having a plurality of transverse fastener apertures disposed substantially transverse a longitudinal axis of said wheel rim, said cap portion coupled with said mounting portion via a plurality of fasteners disposed through said transverse fastener apertures,
   said cap portion including a fluid inlet having a longitudinal axis transverse said longitudinal axis of said wheel rim, said fluid inlet coupled with a fluid conduit in fluid communication with said fluid reservoir,
   said fluid inlet in fluid communication with a channel defined by said cap portion, said channel having a longitudinal axis parallel to said longitudinal axis of said cap portion, said cap portion defining a substantially cylindrical chamber having a first portion and a second portion, wherein said first portion comprises a smaller diameter than said second portion, said first portion in fluid communication with said fluid inlet, said second portion at least partially surrounding a valve member, said chamber having a longitudinal axis parallel with said longitudinal axis of said wheel rim and transverse said longitudinal axis of said fluid inlet, said cap portion comprising a plurality of parallel fastener apertures disposed substantially parallel to a longitudinal axis of said wheel rim, said cap portion coupled with a base portion via a plurality of parallel fasteners disposed through said parallel fastener apertures, whereby said base portion at least partially surrounds said valve member, said base portion including a plurality of transverse fastener apertures disposed substantially transverse a longitudinal axis of said wheel rim, said base portion coupled with said mounting portion via a plurality of fasteners disposed through said transverse fastener apertures, said base portion comprising a fluid outlet in fluid communication with said mounting portion aperture, wherein said fluid outlet defines a curve having a substantially 90 degree angle, and said fluid outlet in selective fluid communication with said fluid inlet via said valve member.

\* \* \* \* \*